United States Patent
Shamie et al.

(10) Patent No.: US 10,220,869 B1
(45) Date of Patent: Mar. 5, 2019

(54) STROLLER WITH EXPANDABLE REAR WHEEL POSITIONING AND ADJUSTABLE FOOTBOARD

(71) Applicant: Delta Enterprise Corp., New York, NY (US)

(72) Inventors: Sam L. Shamie, New York, NY (US); Scott A. Lewis, New York, NY (US)

(73) Assignee: Delta Enterprise Corp., New York, NY (US)

(*) Notice: Subject to any disclaimer, the term of this patent is extended or adjusted under 35 U.S.C. 154(b) by 0 days.

(21) Appl. No.: 15/892,568

(22) Filed: Feb. 9, 2018

(51) Int. Cl.
  B62B 7/08 (2006.01)
  B62B 9/28 (2006.01)
  B62B 5/08 (2006.01)
  B62B 7/10 (2006.01)

(52) U.S. Cl.
  CPC ............... *B62B 7/08* (2013.01); *B62B 5/087* (2013.01); *B62B 7/10* (2013.01); *B62B 9/28* (2013.01)

(58) Field of Classification Search
  CPC .... B62B 7/06; B62B 7/08–7/086; B62B 7/10; B62B 5/087
  See application file for complete search history.

(56) References Cited

U.S. PATENT DOCUMENTS

| | | | | |
|---|---|---|---|---|
| 3,995,882 A | * | 12/1976 | Watkins | B62B 7/068 280/649 |
| 4,216,974 A | * | 8/1980 | Kassai | B62B 7/062 280/42 |
| 4,741,551 A | * | 5/1988 | Perego | B62B 7/08 280/47.4 |
| 6,086,087 A | * | 7/2000 | Yang | B62B 7/06 280/47.41 |
| 6,422,653 B1 | * | 7/2002 | Szczepanski | A61G 5/12 280/291 |
| 6,951,342 B2 | * | 10/2005 | Lan | B62B 7/08 280/47.38 |
| 7,004,272 B1 | * | 2/2006 | Brown | B60K 1/00 180/65.1 |
| 7,850,177 B2 | * | 12/2010 | Gilhuly | B62B 9/28 280/47.19 |
| 8,066,300 B2 | * | 11/2011 | Ohnishi | B62B 7/08 280/47.25 |
| 9,308,929 B1 | * | 4/2016 | Dowd | B62B 7/062 |
| 9,545,941 B2 | * | 1/2017 | Pacella | B62B 7/145 |
| 2001/0013688 A1 | * | 8/2001 | Warner, Jr. | B62B 7/08 280/47.38 |

(Continued)

*Primary Examiner* — Erez Gurari
(74) *Attorney, Agent, or Firm* — Richard M. Goldberg

(57) ABSTRACT

A stroller includes a left side support frame; a right side support frame; and a connecting frame which connects the left and right side support frames together, and which defines a seat rest for a child; wheels rotatably connected to a front and rear of each support frame; at least one rear footboard connected to a rear end of the stroller; an adjustment assembly which rotatably connects the rear wheels to a rear of the support frames, between a first inward operative position and each rear footboard to a vertical position for use when a child is not standing on the at least one rear footboard and a second outward operative position and each rear footboard to a horizontal position which increases a footprint of the stroller for use when a child is standing on the at least one rear footboard.

16 Claims, 42 Drawing Sheets

(56) References Cited

U.S. PATENT DOCUMENTS

| | | | |
|---|---|---|---|
| 2003/0030252 A1* | 2/2003 | Huang | B62B 7/123 280/650 |
| 2004/0150174 A1* | 8/2004 | Lan | B62B 7/083 280/47.4 |
| 2005/0151348 A1* | 7/2005 | Liu | B62B 7/083 280/293 |
| 2007/0096434 A1* | 5/2007 | Haeggberg | B62B 7/062 280/642 |
| 2009/0102149 A1* | 4/2009 | Ohnishi | B62B 7/08 280/47.38 |
| 2009/0243260 A1* | 10/2009 | Longenecker | B62B 7/083 280/642 |
| 2010/0264628 A1* | 10/2010 | Ohnishi | B62B 7/066 280/651 |
| 2010/0282800 A1* | 11/2010 | Li | B62B 7/08 224/409 |
| 2011/0291388 A1* | 12/2011 | Sellers | B62B 7/08 280/647 |
| 2012/0098237 A1* | 4/2012 | Winterhalter | B62B 7/008 280/647 |
| 2013/0009388 A1* | 1/2013 | Funakura | B62B 7/08 280/650 |
| 2013/0056961 A1* | 3/2013 | Storm | B62B 7/10 280/650 |
| 2013/0140779 A1* | 6/2013 | Paul | A47C 7/62 280/47.4 |
| 2013/0264787 A1* | 10/2013 | Cheng | B62B 7/008 280/47.38 |
| 2014/0035261 A1* | 2/2014 | Rembisz | B62B 7/066 280/650 |
| 2014/0159346 A1* | 6/2014 | Laffan | B62B 7/008 280/650 |
| 2014/0346756 A1* | 11/2014 | Laffan | B62B 9/26 280/648 |
| 2015/0232114 A1* | 8/2015 | Gillett | B62B 7/12 280/30 |
| 2015/0239485 A1* | 8/2015 | Thorne | B62B 7/08 280/42 |
| 2017/0021852 A1* | 1/2017 | Bastien | B62B 7/08 |
| 2017/0057533 A1* | 3/2017 | Ransil | B62B 7/08 |
| 2018/0201291 A1* | 7/2018 | Liu | B62B 7/006 |

* cited by examiner

STROLLER WITH EXPANDABLE REAR WHEEL POSITIONING AND ADJUSTABLE FOOTBOARD

BACKGROUND OF THE INVENTION

The present invention relates generally to infant strollers, and more particularly, is directed to an infant stroller with a rear footboard on which an older child can stand.

It is well known to provide a stroller with a stand-on bar at the rear thereof for an older child to stand on while a younger infant is sitting in the stroller. An example of such a stand-on bar is found in the PEG PEREGO Peg Perego Pilko P3 compact stroller sold by Peg Perego U.S.A., Inc. However, because the footprint of the stroller remains the same at all times, an older child standing on the stand-on bar could result in instability of the stroller.

The CHICCO BRAVO stroller sold by Artsana S.p.A., BABY TREND SIT N' STAND sold by Baby Trend, Inc. and GRACO Ready2Grow strollers sold by Graco Children's Products Inc. provide a fixed rear standing footboard for the older child to stand on, in which the child must stand within the frame of the handlebars. However, again, because the footprint of the stroller remains the same at all times, this could result in instability of the stroller.

In addition, the use of the footboard which is fixed in position at all times can result in difficulties in controlling the stroller since the person pushing the stroller will often kick the footboard while walking.

SUMMARY OF THE INVENTION

Accordingly, it is an object of the present invention to provide to an infant stroller with a rear footboard on which an older child can stand, that overcomes the aforementioned problems.

It is another object of the present invention to provide to an infant stroller with a rear footboard on which an older child can stand, in which the rear wheels are movable between an inward position when no child is standing on the footboard and an outward position to increase the footprint of the stroller when a child is standing on the footboard.

It is still another object of the present invention to provide to an infant stroller with a rear footboard on which an older child can stand in which the footboard is automatically moved to an inoperative out of the way position when the rear wheels are moved to an inward position when no child is standing on the footboard.

It is yet another object of the present invention to provide to an infant stroller with a rear footboard on which an older child can stand in which the footboard is automatically moved to an operative position when the rear wheels are moved to an outward position for supporting a child standing on the footboard.

It is a further object of the present invention to provide to an infant stroller with a rear footboard in which the rear footboard is automatically moved between the inoperative and operative positions when the rear wheels move between the inward position and outward position.

In accordance with an aspect of the present invention, a stroller includes a left side support frame; a right side support frame; and a connecting frame which connects the left side support frame and right side support frame together, the connecting frame including a seat rest for a child. Left and right side front wheels are rotatably connected to a front of the left side support frame and right side support frame, respectively. The stroller also includes left and right side rear wheels. At least one rear footboard is connected to a rear end of the stroller. An adjustment assembly rotatably connects the left and right side rear wheels to a rear of the left side support frame and right side support frame, respectively, between a first inward operative position of the stroller for use when a child is not standing on the at least one rear footboard and a second outward operative position of the stroller which increases a footprint of the stroller for use when a child is standing on the at least one rear footboard.

The adjustment assembly includes a rear wheel support at left and right sides of the stroller, with each rear wheel support having one end pivotally connected to the rear of one of the left and right side support frames, and at least one the rear wheel rotatably connected to an opposite end of each rear wheel support.

The adjustment assembly further includes a releasable securing assembly at left and right sides of the stroller and connected with each rear wheel support for releasably securing each rear wheel support between a first securing position when the rear wheels are at the first inward operative position and a second securing position when the rear wheels are at the second outward operative position. In this regard, each of the left and right side support frames includes a front frame and a rear frame connected to the front frame, and the releasable securing assembly includes a slide member slidably mounted between a first upper position and a second lower position on the respective rear frame, and the one end of each rear wheel support being pivotally connected to a respective slide member.

Specifically, the releasable securing assembly includes upper and lower spring biased members mounted to each rear frame for locking engagement with the respective slide member, and each slide member includes a release button for disengaging the upper and lower spring biased members from the slide member to enable sliding of the slide member on the respective rear frame for movement between the first upper position and second lower position.

The adjustment assembly further includes a link arm connecting the rear frame of each left and right support frame with a respective wheel support.

Preferably, each rear wheel support includes a rear wheel rod.

Each rear footboard is connected to a respective one of the left and right side support frames in a manner to automatically move between a vertical position which prevents a child from standing thereon when the left and right side rear wheels are moved to the first inward operative position, and a horizontal position which permits a child to stand thereon when the left and right side rear wheels are moved to the second outward operative position.

The adjustment assembly includes a rear wheel support at left and right sides of the stroller, with each rear wheel support having one end pivotally connected to the rear of one of the left and right side support frames, and at least one the rear wheel rotatably connected to an opposite end of each rear wheel support; and each rear footboard is pivotally mounted to a respective rear wheel support.

Specifically, each of the left and right side support frames includes a front frame and a rear frame connected to the front frame; and the stroller further includes a pivot support housing for pivotally mounting each rear footboard to a respective rear wheel support, and a link arm connecting the rear frame of each left and right support frame with a respective pivot support housing.

Preferably, each pivot support housing includes at least one support bar extending from the pivot support housing to a position beneath the respective rear footboard for providing additional support.

Each rear footboard includes an outer footboard standing section connected to a rear end of the stroller, and an inner footboard standing section hingedly connected to the respective outer footboard standing section, for movement between a first position in which the outer footboard standing section and inner footboard standing section are coplanar and a second position in which the outer footboard standing section and inner footboard standing section are at right angles to each other.

In accordance with another aspect of the present invention, a stroller includes a left side support frame; a right side support frame; a connecting frame which connects the left side support frame and right side support frame together, the connecting frame including a seat rest for a child; left and right side front wheels rotatably connected to a front of the left side support frame and right side support frame, respectively; left and right side rear wheels; and at least one rear footboard connected to a rear end of the stroller, with each rear footboard connected to a respective one of the left and right side support frames and movable between a vertical position which prevents a child from standing thereon and a horizontal position which permits a child to stand thereon.

The above and other objects, features and advantages of the invention will become readily apparent from the following detailed description thereof which is to be read in connection with the accompanying drawings.

DETAILED DESCRIPTION

Figure 1:
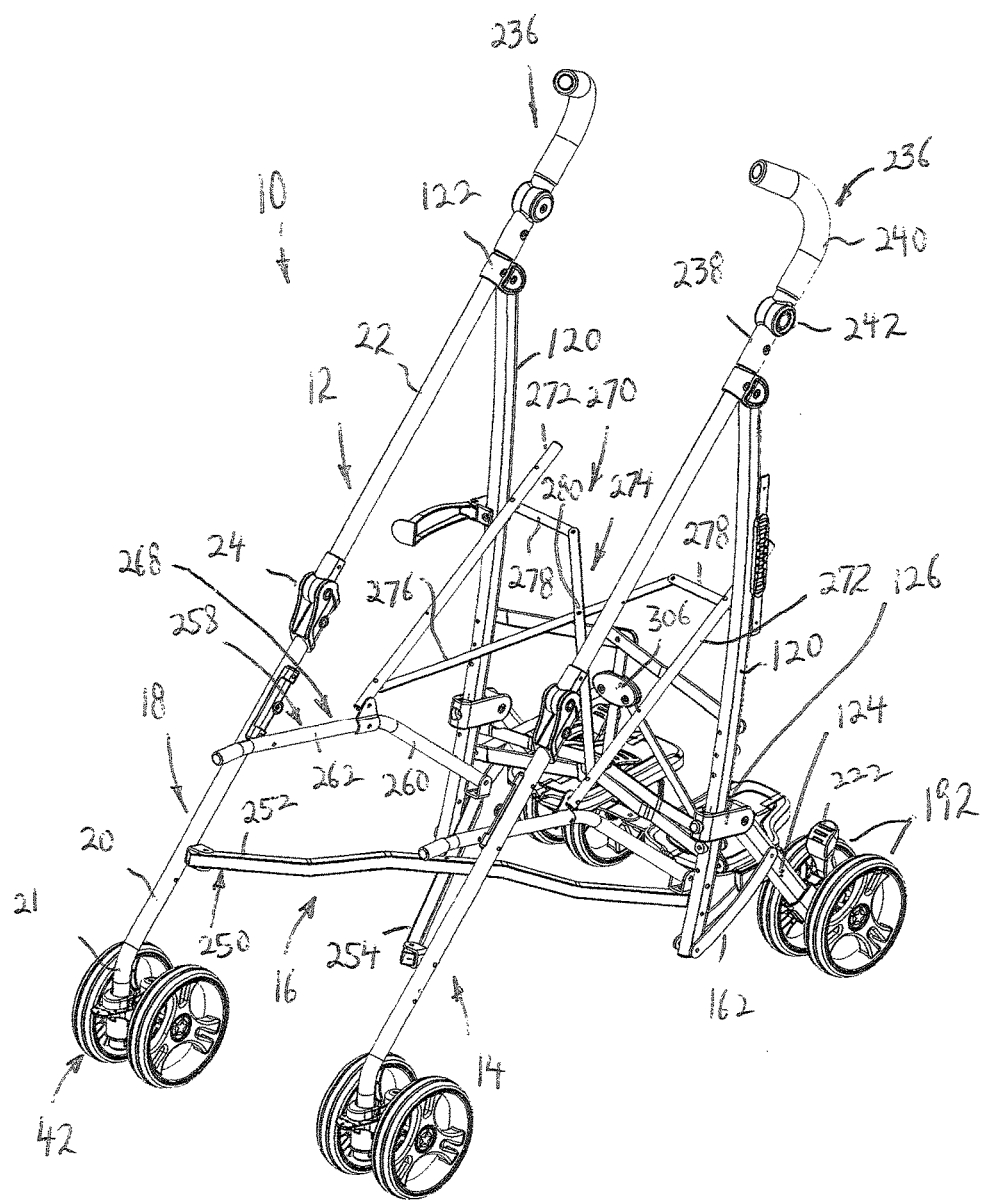
FIG. 1 is a front, perspective view of a stroller according to the present invention, with the rear wheels in an outwardly extending position and without the fabric secured to the upper frame.

Referring to the drawings in detail, and initially to FIGS. 1-9 thereof, a stroller 10 according to the present invention includes a left side support frame 12, a right side support frame 14 and a connecting frame 16 which connects together left side frame 12 and right side frame 14.

The following description will be as to left side support frame 12, with the understanding that right side support frame 14 is identical and denoted by the same numerals, except where otherwise stated.

Left side support frame 12 includes a front frame 18 formed by a lower front rod 20 and an upper front rod 22 hingedly connected by a hinge assembly 24 at its lower end to the upper end of lower front rod 20.

Figure 10:
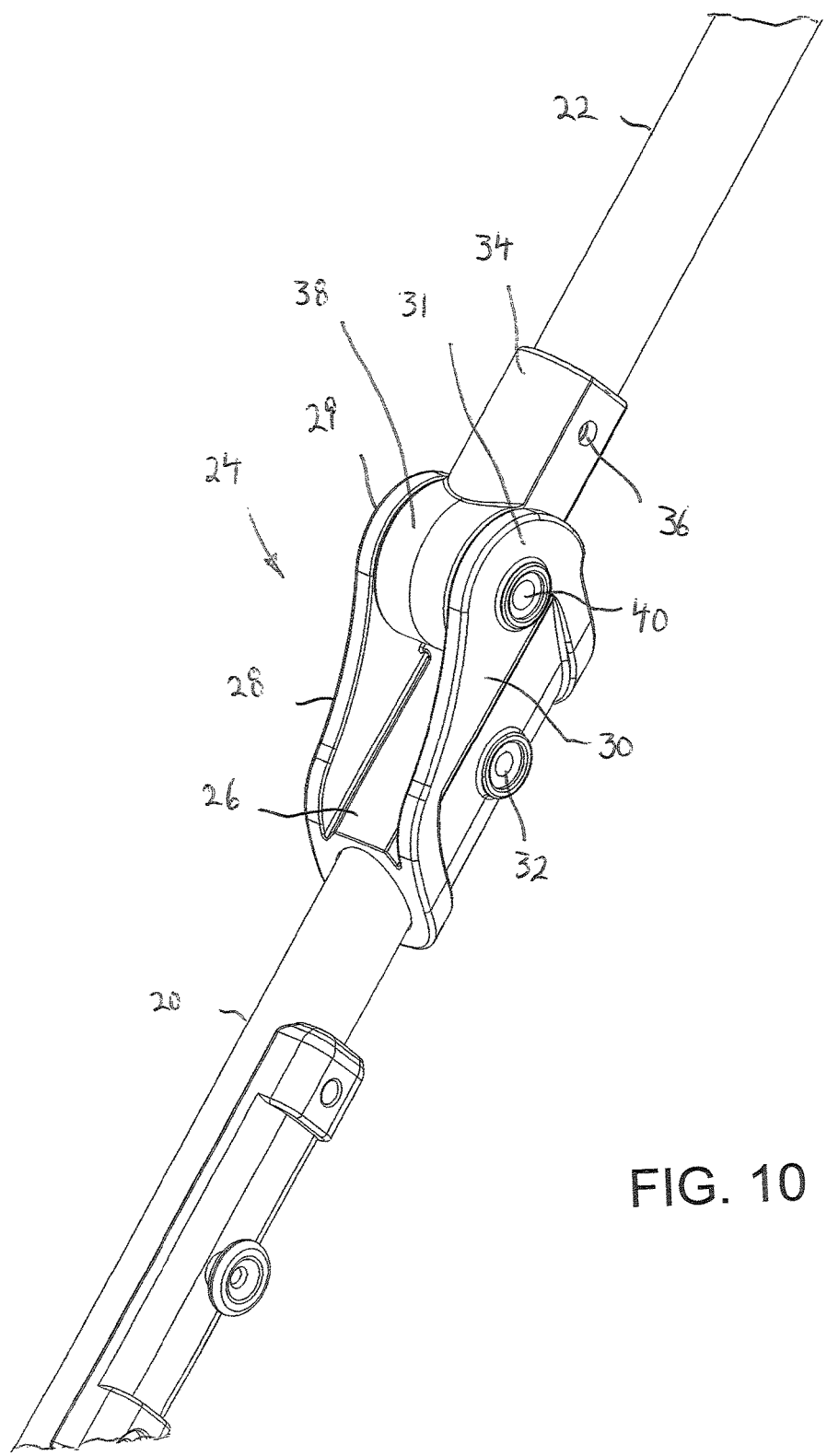
FIG. 10 is a perspective view of the hinge assembly for hingedly connecting the upper and lower front rods.

As shown best in FIG. 10, hinge assembly 24 includes a first section formed by a short tube 26 for receiving the upper end of lower front rod 20 and two parallel side plates 28, 30 connected to opposite sides of short tube 26. Side plates 28, 30 include side plate extensions 29, 31 which extend outwardly from short tube 26 in parallel, spaced apart relation. A rivet 32 extends through side plates 28, 30, short tube 26 and the upper end of lower front rod 20 to secure the same together. Hinge assembly 24 further includes a second section formed by a short tube 34 for receiving the lower end of upper front rod 22. A rivet 36 extends through short tube 34 and the lower end of upper front rod 22 to secure the same together. The second section includes a cylindrical connector 38 at the lower end of short tube 34 which is positioned between side plate extensions 29, 31, with a pivot pin 40 extending through side plate extensions 29, 31 and cylindrical connector 38 so as to rotatably secure lower front rod 20 to upper front rod 22.

As shown in FIGS. 1 and 11-14, lower front rod 20 has a lower bent end section 21. A lower front wheel assembly 42 is rotatably connected to lower bent end section 21. Specifically, a rotation supporting member 44 is fixedly secured to lower bent end section 20a. Rotation supporting member 44 includes a tube 46 through which lower bent end section 21 extends with the lower ends of lower bent end section 21 and tube 46 being coplanar. Rotation supporting member 44 further includes an enlarged stop member 48 fixed to the upper end of tube 44 and including diametrically opposite openings 50 therein. Enlarged stop member 48 extends radially outwardly at the front end from tube 48 and includes a locking recess 49 at the underside thereof. The lower end of tube 46 includes two diametrically opposite openings 52, with two ramp members 54 formed with tube 46 as a single molded arrangement and hingedly secured at lower ends 55 of openings 52. Ramp members 54 are molded so as to be normally biased outwardly of openings 52. A rivet (not shown) extends through openings 50 and through aligned openings (not shown) in bent end section 21 to fixedly secure rotation supporting member 44 on bent end section 21.

As shown in FIGS. 11, 12, 15 and 16, a rotation and wheel lock member 60 is rotatably mounted on rotation supporting member 44. Rotation and wheel lock member 60 includes a rotatable annular cylinder 62 rotatably mounted on tube 46. Cylinder 62 is axially fixed on tube 46, that is, constrained at its upper end by enlarged diameter stop member 48 and at its lower end by upper surfaces of ramp members 54. When assembling cylinder 62 on tube 46, ramp members 54 spring inwardly during such assembly, and then, after the lower end of cylinder 62 passes ramp members 54, ramp members 54 spring back outwardly to lock cylinder 62 rotatably in position.

Rotation and wheel lock member 60 further includes an annular wheel support part-cylinder 64 for rotatably supporting a pair of lower front wheels 66 thereon. Wheel support part-cylinder 64 is open at its lower end and closed by an upper wall 65 at its upper end. Wheel support part-cylinder 64 includes a part-annular inner wall 64b connected to a planar inner wall 64c. Wheel support part-cylinder 64 is connected in parallel, spaced relation to cylinder 62 by an elongated connection body 68. Wheel support part-cylinder 64 includes two diametrically elongated openings 70, with a circumferential wall 72 having the shape and dimensions of each opening 70 extending outwardly from support part-cylinder 64 in surrounding relation to each opening 70.

As will be explained hereafter, elongated connection body 68 includes two annular bosses 74 extending outwardly from opposite sides thereof, and two locking ball detents 75 extend outwardly from opposite sides of rotatable annular cylinder 62.

Figure 12:
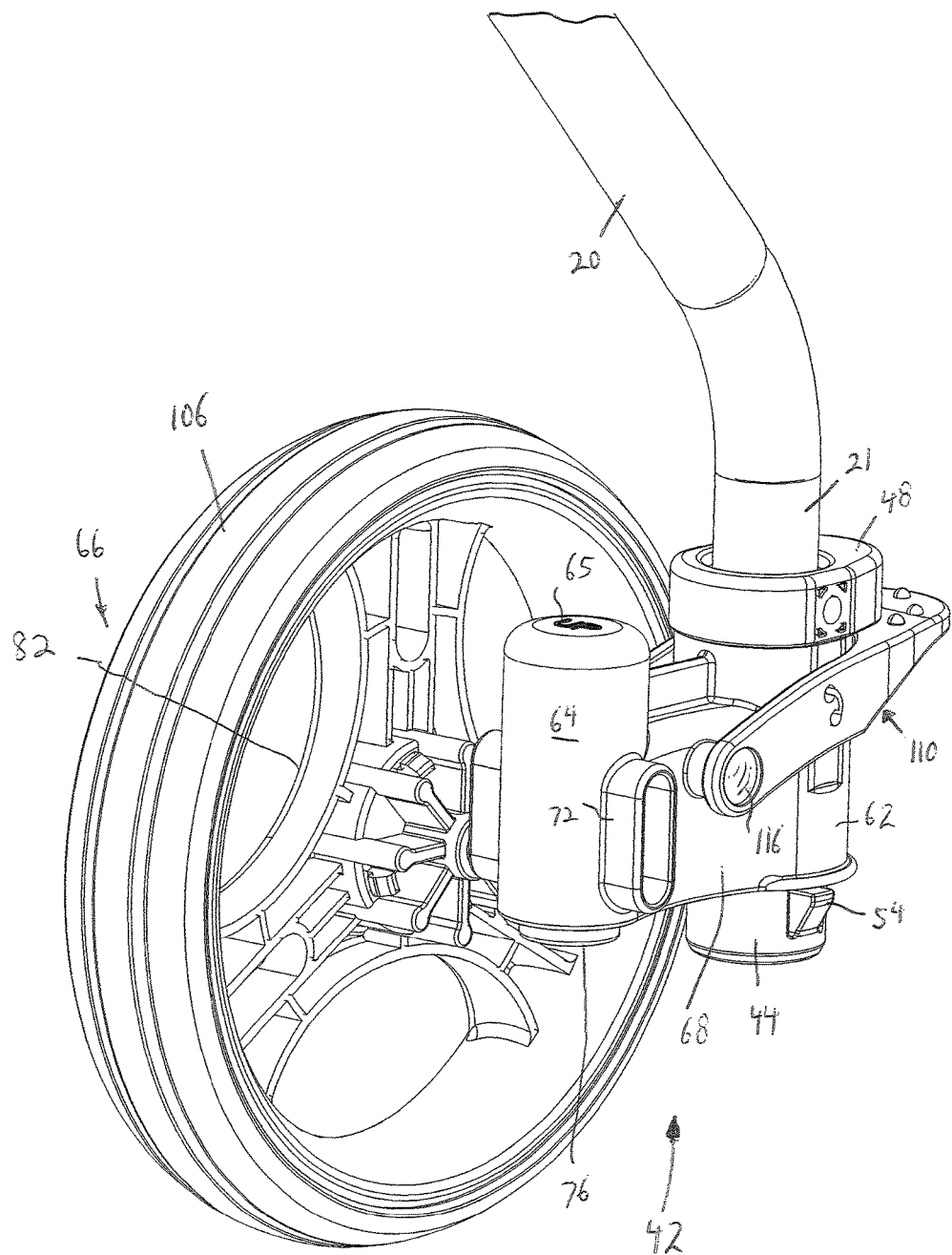
FIG. 12 is a rear perspective view of the lower front wheel assembly with the inner wheel thereof removed.
Figure 13:
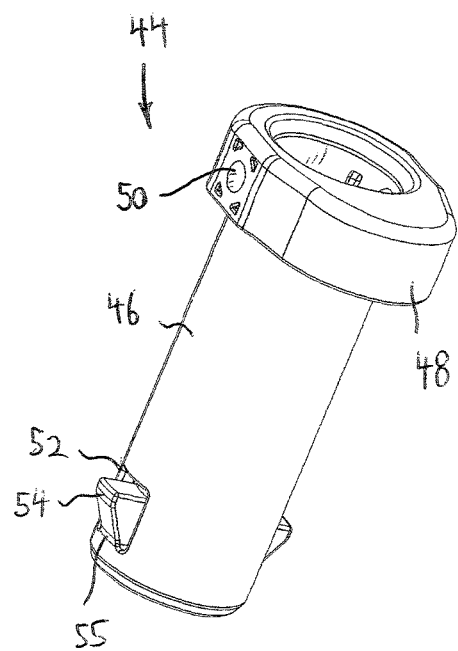
FIG. 13 is a top perspective view of the rotation supporting member of the lower front wheel assembly.
Figure 14:
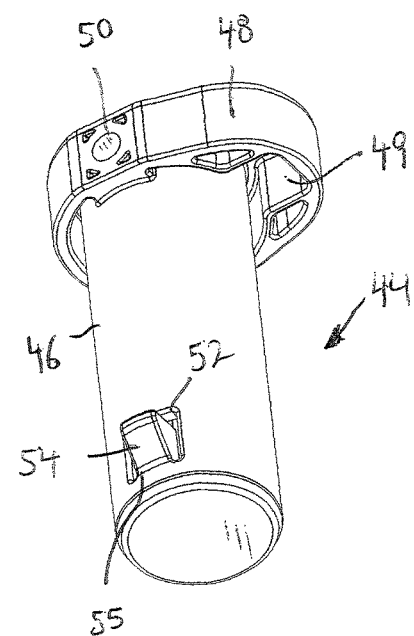
FIG. 14 is a bottom perspective view of the rotation supporting member of the lower front wheel assembly.
Figure 15:
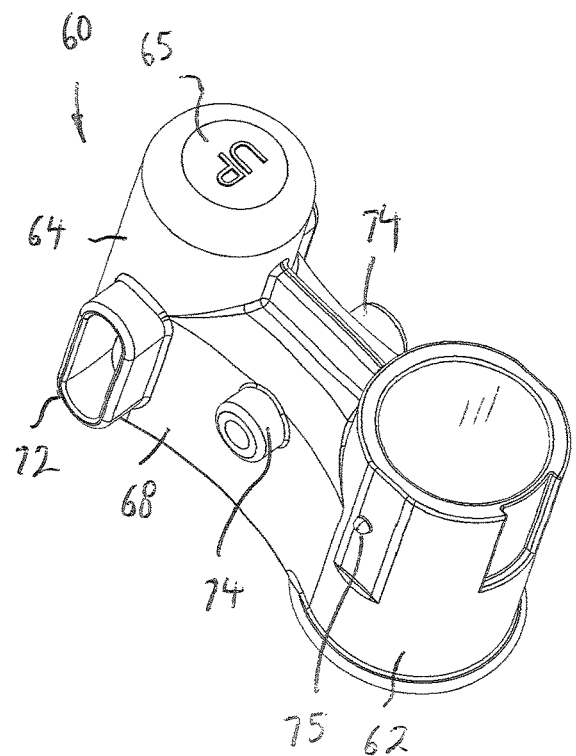
FIG. 15 is a top perspective view of the rotation and wheel lock member of the lower front wheel assembly.
Figure 16:
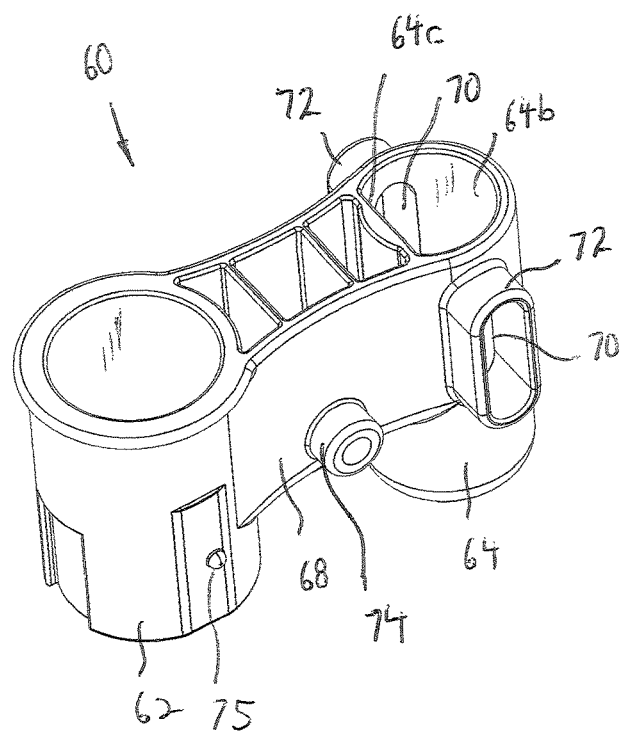
FIG. 16 is a bottom perspective view of the rotation and wheel lock member of the lower front wheel assembly.
Figure 17:
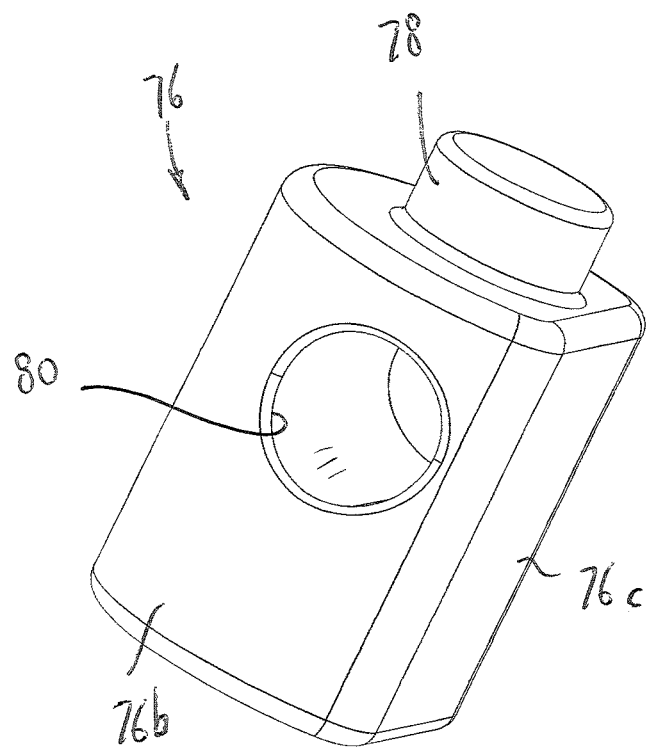
FIG. 17 is a perspective view of the axle support body of the lower front wheel assembly.
Figure 18:
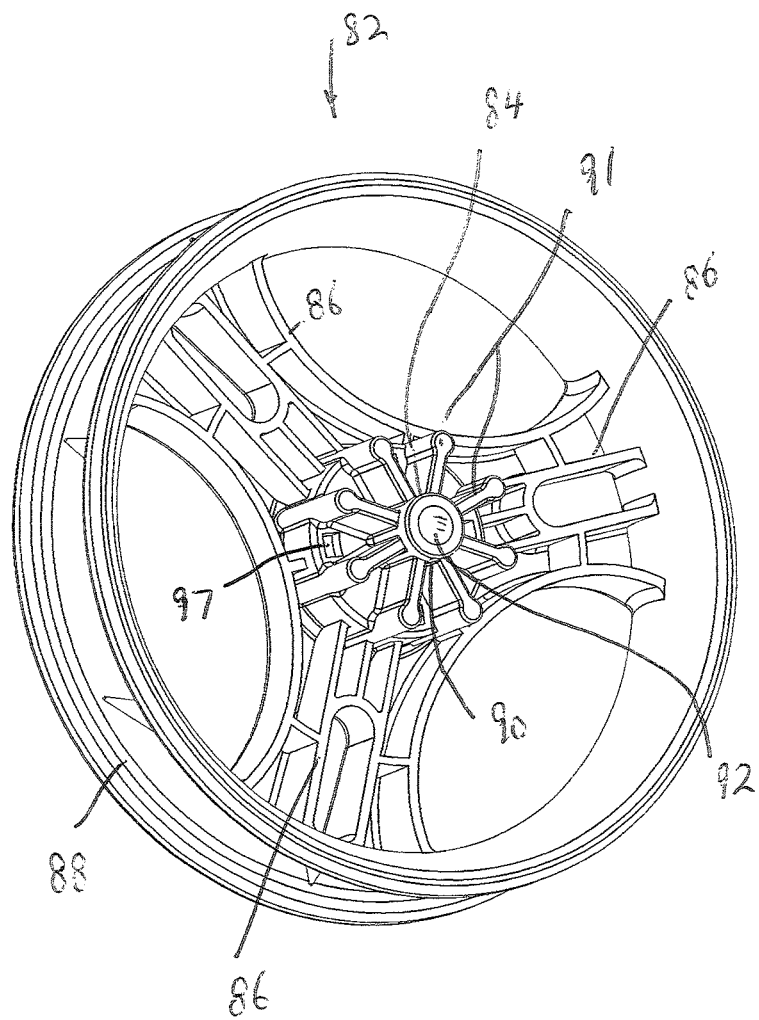
FIG. 18 is an inside perspective view of a wheel rim.
Figure 19:
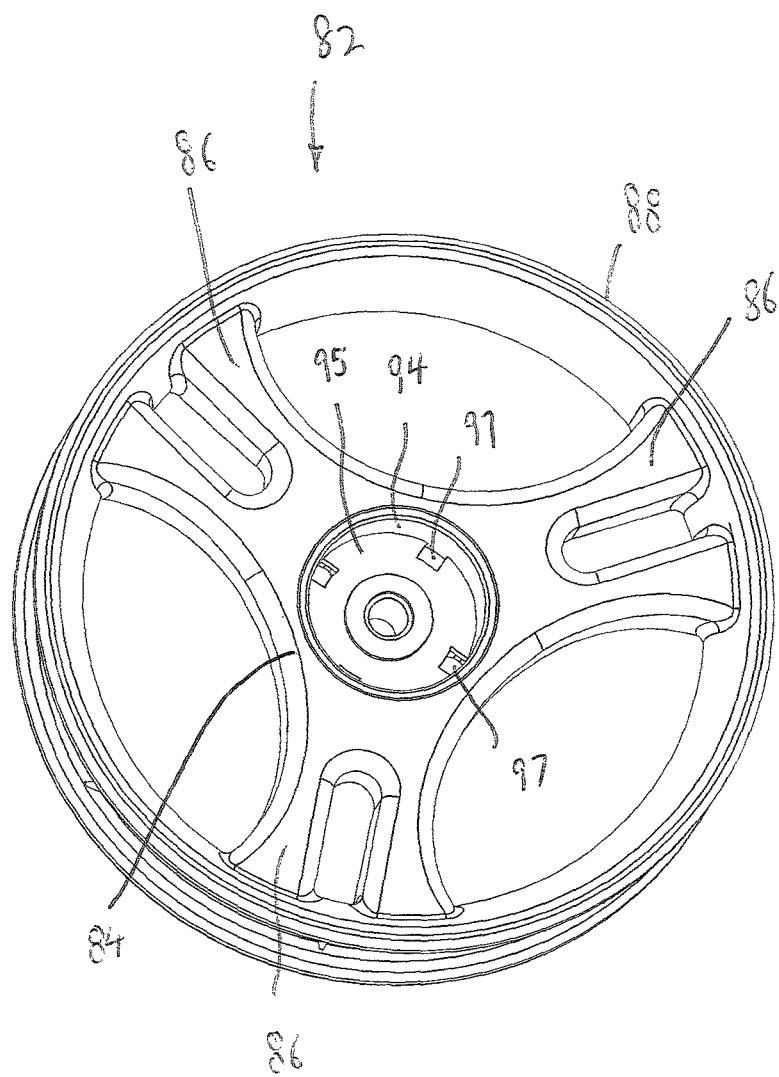
FIG. 19 is an outside perspective view of the wheel rim.

As shown best in FIGS. 12 and 17, an axle support body 76 is fit within wheel support part-cylinder 64 through the lower end thereof. Specifically, axle support body 76 has an outer shape and dimensions that correspond to the inner shape and dimensions of wheel support part-cylinder 64, so as to define a part-cylindrical wall 76b connected to a planar wall 76c. An upper cylindrical boss 78 on axle support body 76 abuts against the inner surface of upper wall 65, and has a transverse through opening 80 extending therethrough, with the axis of opening 80 extending parallel to planar wall 76c. In this regard, when axle support body 76 is fit within wheel support part-cylinder 64 such that upper cylindrical boss 78 abuts against the inner surface of upper wall 65, a wheel axle (not shown) extends through transverse through opening 80, a corresponding through opening (not shown) in lower bent end section 21 and out through opposite elongated circumferential walls 72 at the lower ends thereof. Because of the above arrangement, the wheel axle is prevented from moving vertically.

As shown in FIGS. 11, 12, 18 and 19, two lower front wheels 66 are provided, each including a wheel rim 82. Each wheel rim 82 includes a central hub 84, three radially extending arms 86 extending radially outward from central hub 84 and an annular tire mounting barrel 88 formed at the outer ends of radially extending arms 86. Central hub 84 includes an inner axially extending boss 90, with a through bore 92 extending axially through boss 90 and central hub 84. A plurality of, for example, eight, equiangularly spaced, radially extending arms 91 extend radially outward from inner axially extending boss 90. The opposite outer side of central hub 84 includes a circular recess 94 closed by a circular bottom wall 95. Four small axially extending openings 97 are provided equiangularly within bottom wall 95 of circular recess 94 and extend to the inner side of central hub 84.

In this manner, the wheel axle extends through bore 92 to a position within circular recess 94. An enlarged head (not shown) is secured to the outer ends of the wheel axle within each circular recess 94 so as to prevent escape of wheel rim 82 and to provide for free rotation of each wheel rim 82 about the wheel axle.

Figure 11:
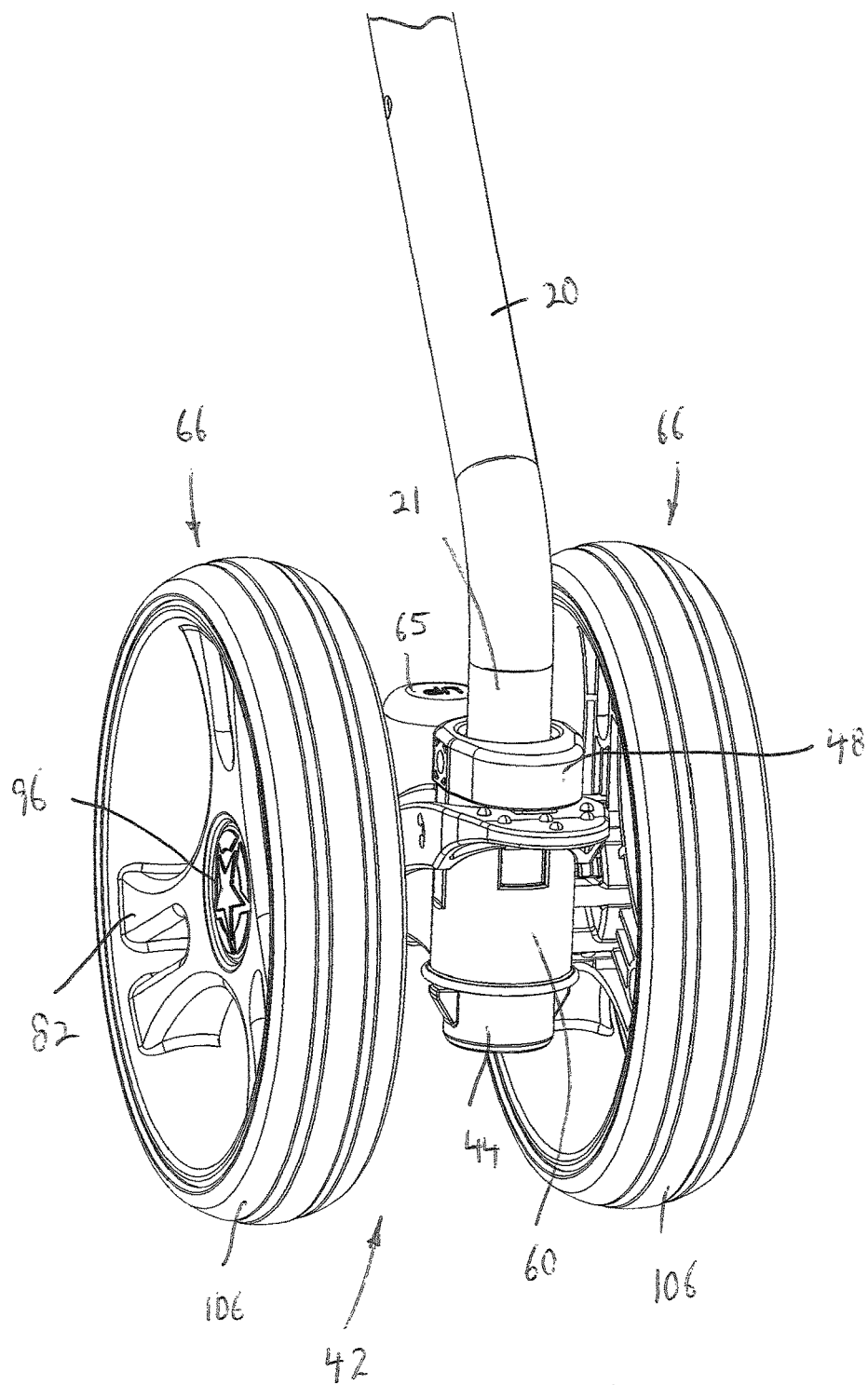
FIG. 11 is a front perspective view of the lower front wheel assembly.
Figure 20:
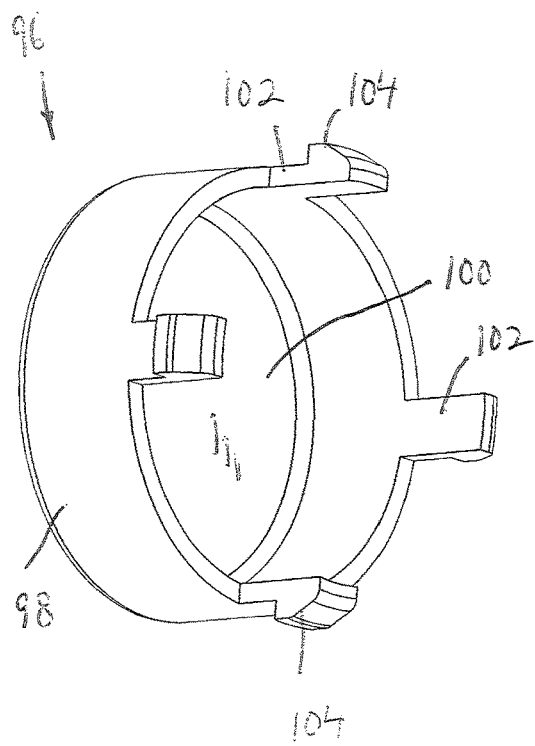
FIG. 20 is an inside perspective view of the closure member for the wheel rim.
Figure 21:
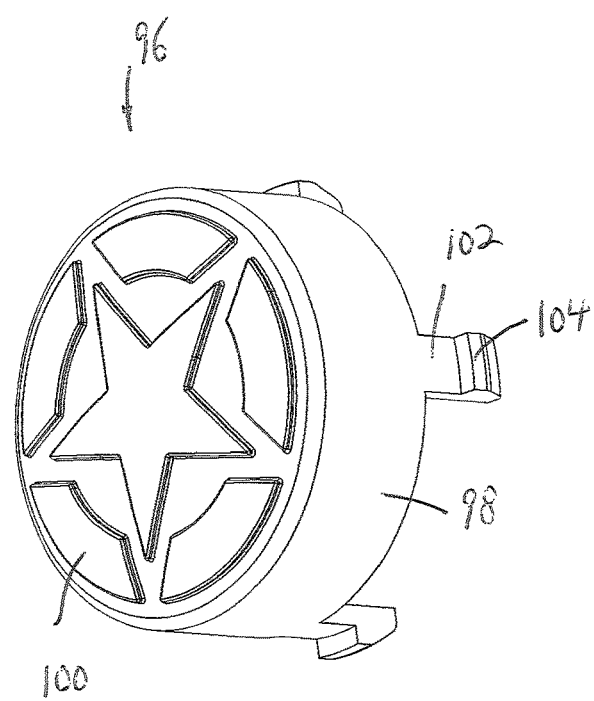
FIG. 21 is an outside perspective view of the closure member for the wheel rim.

As shown in FIGS. 11, 20 and 21, a closure member 96 is mounted within each circular recess 94 to close off each circular recess 94. Closure member 96 includes an annular wall 98 that fits within the confines of recess 94, an outer circular closure wall 100 that closes off one end of annular wall 98 and four legs 102 equiangularly extending from the opposite end of annular wall 98, with each leg 102 including a catch 104 at the free end thereof. Each leg 102 and catch 104 extend through a small opening 97 to the opposite side of central hub 84. In such case, each leg 102 is biased slightly inwardly due to catch 104, and once catch 104 extends to the opposite side of central hub 84, the respective leg 102 returns by spring action to its original position such that the catch 104 locks closure member 96 in position.

A plastic annular tire 106 is mounted on each annular tire mounting barrel 88.

Figure 22:
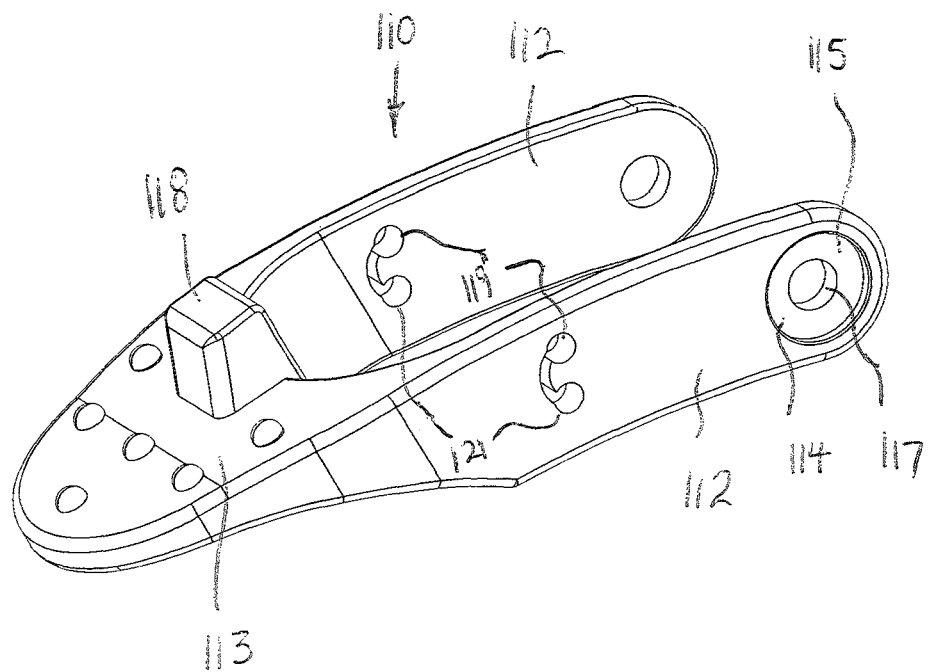
FIG. 22 is a perspective view of the wheel locking lever of the lower front wheel assembly.

As shown in FIGS. 11, 12 and 22, a wheel locking lever 110 is pivotally connected to rotation and wheel lock member 60. Specifically, wheel locking lever 110 includes two parallel, spaced apart lever arms 112 connected together at front ends thereof by a connection 113. The rear end of each lever 112 includes an outer facing recess 114 with a planar bottom 115 including a through opening 117. Lever arms 112 are pivoted about openings 117 and are in alignment with annular bosses 74. In this manner, a rivet 116 extends through openings 117 and annular bosses 74 to pivotally secure wheel locking lever 110 to rotation and wheel lock member 60. In such case, the heads of the securing rivets 116 are positioned within recesses 114.

Approximately midway between recesses 114 and connection 113 on each lever arm 112, are two vertically offset recesses or openings 119 and 121. When lever arms 112 are pivoted about bosses 74, detents 75 extend within one of the openings 119 or 121 to releasably lock the lever arms 112 in one of two positions.

The upper surface of connection 113 includes a locking projection 118. When lever arms are rotated upwardly about bosses 74 such that detents 75 are positioned within upper openings 119, locking projection 118 fits within locking recess 49 of enlarged diameter stop member 48 to prevent rotation of lower front wheel assembly 42 about lower bent end section 21.

Referring back to FIGS. 1-9, left side frame support frame 12 further includes a rear rod 120 which is slightly curved. The upper end of rear rod 120 is pivotally connected to the upper and of upper frame rod 22 by a hinge clamp 122.

Figure 23:
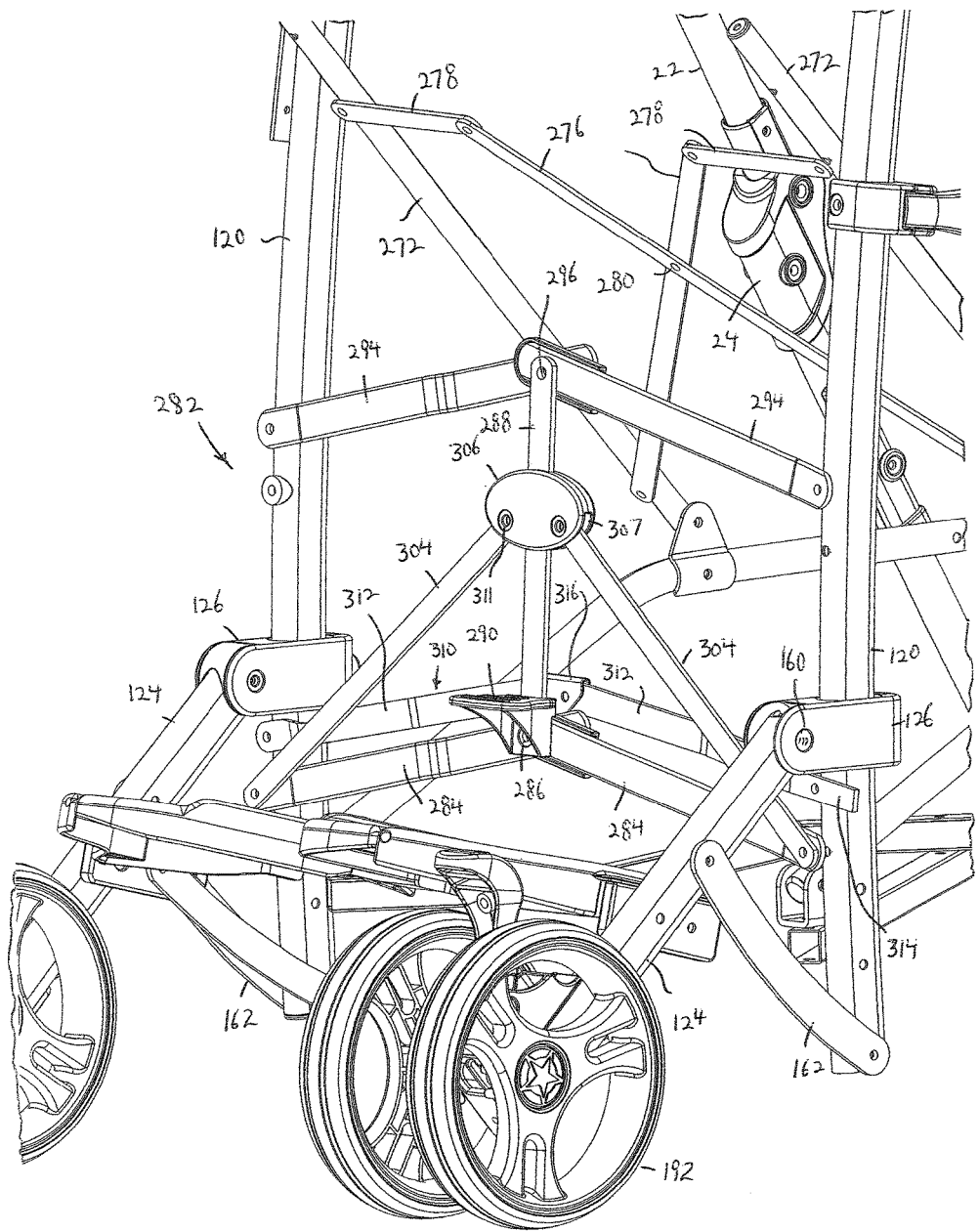
FIG. 23 is a perspective view of the rear wheel assembly and rear connecting frame assembly.
Figure 23A:
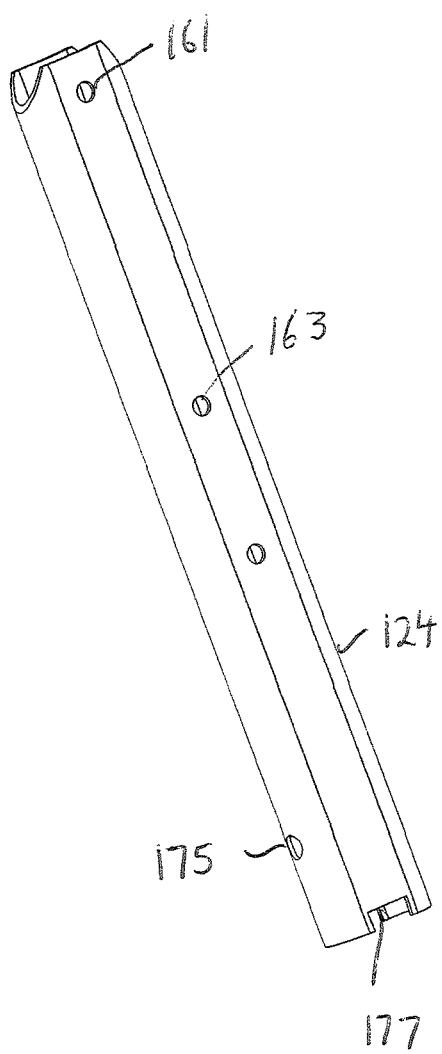
FIG. 23A is a perspective view of the rear wheel support rod.

As shown best in FIG. 23, a rear wheel support rod 124 has its upper end pivotally connected to a slide member 126 that is slidably positioned on rear rod 120 at a position spaced a small distance from the lower end thereof. Slide member 126 is movable along rear rod 120 between an upper and lower position thereon. Rear wheel support rod 124 is best shown in FIG. 23A.

Figure 24:
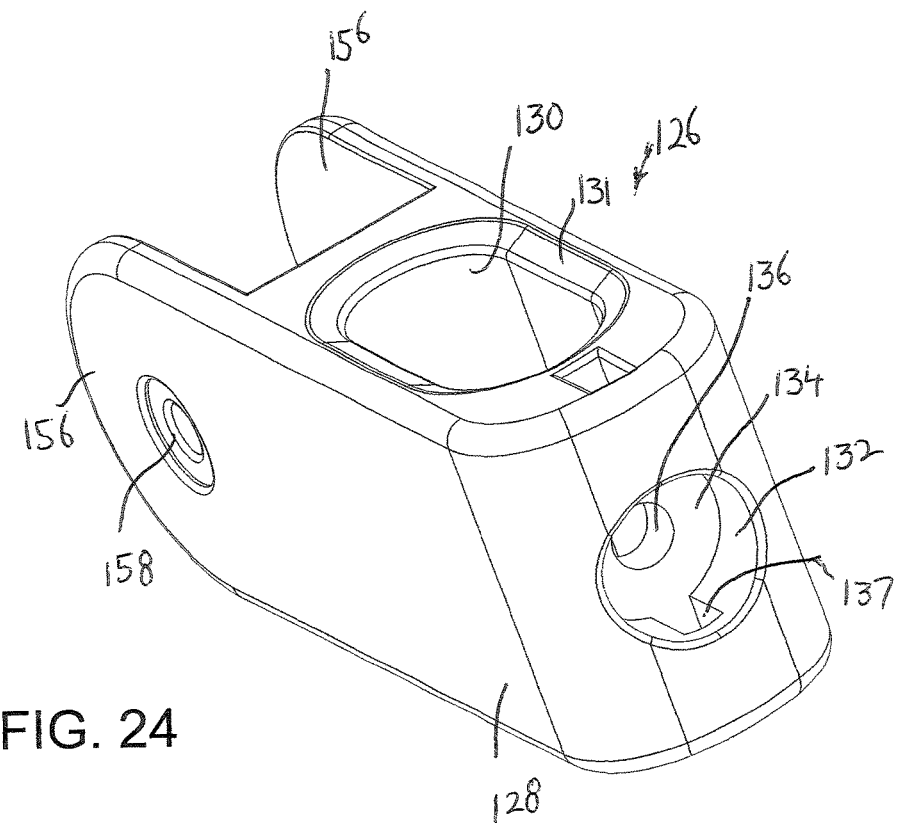
FIG. 24 is a top perspective view of the slide member of the rear wheel assembly.
Figure 25:
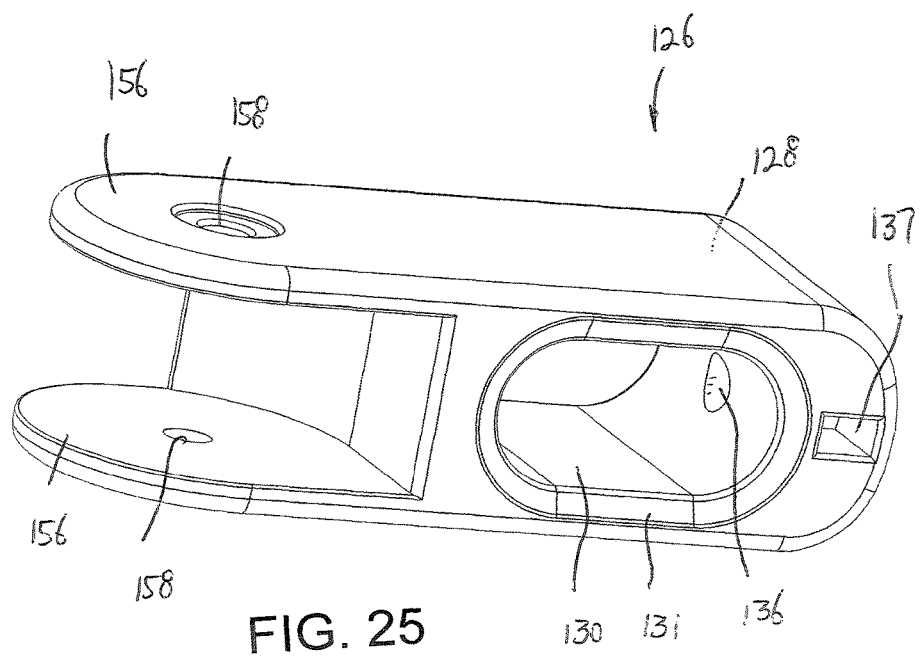
FIG. 25 is a bottom perspective view of the slide member of the rear wheel assembly.

Specifically, as shown best in FIGS. 24 and 25, slide member 126 includes a main body 128 having a large slide opening 130 extending vertically therethrough to slidably receive rear rod 120. Large slide opening 130 is provided with a bevel 131 at the periphery thereof at both open ends thereof. A pushbutton recess 132 is formed at one end of main body 128 perpendicular to large opening 130, and has a bottom wall 134 with a through opening 136 therein that is in open communication with large slide opening 130. Through opening 136 has a smaller diameter than pushbutton recess 132. In addition, the cylindrical outer wall of pushbutton recess 132 includes two vertically oriented and diametrically opposite limit openings 137 that extend from bottom wall 134 to a position spaced from the outer wall of slide member 126.

Figure 26:
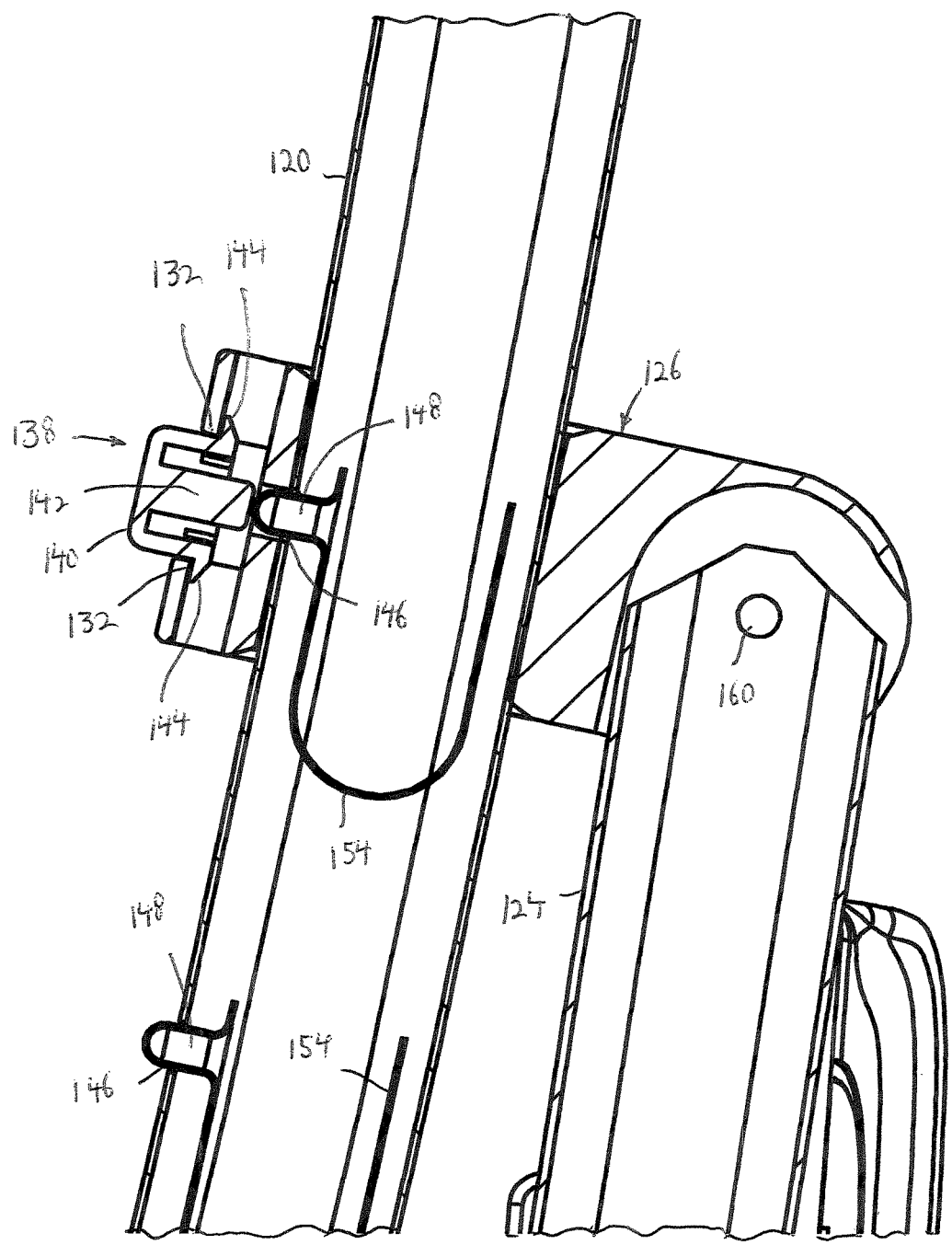
FIG. 26 is a cross-sectional view of the slide member on the rear rod of the frame.
Figure 27:
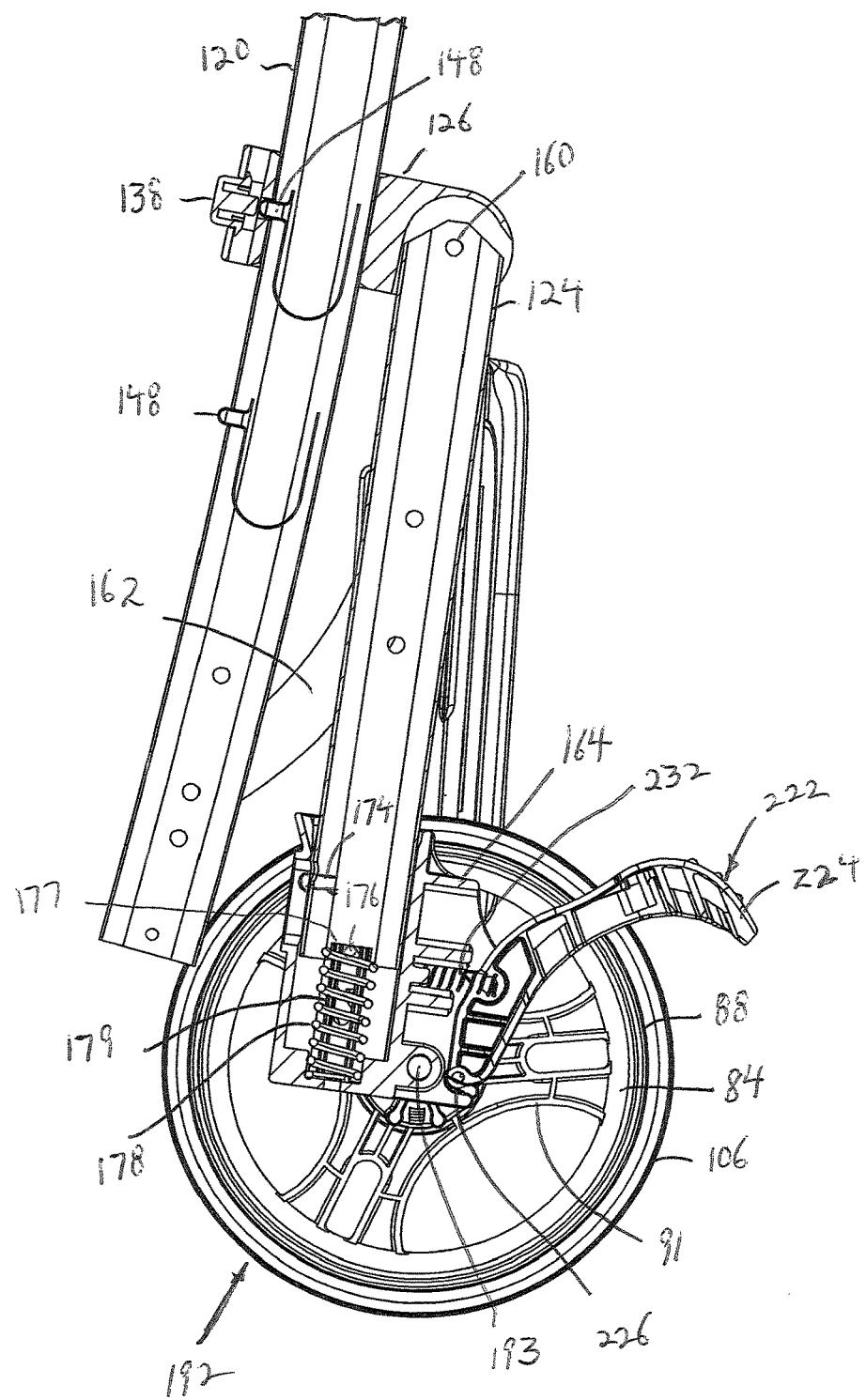
FIG. 27 is a cross-sectional view of the slide member on the rear rod of the frame in its upper secured position.
Figure 28:
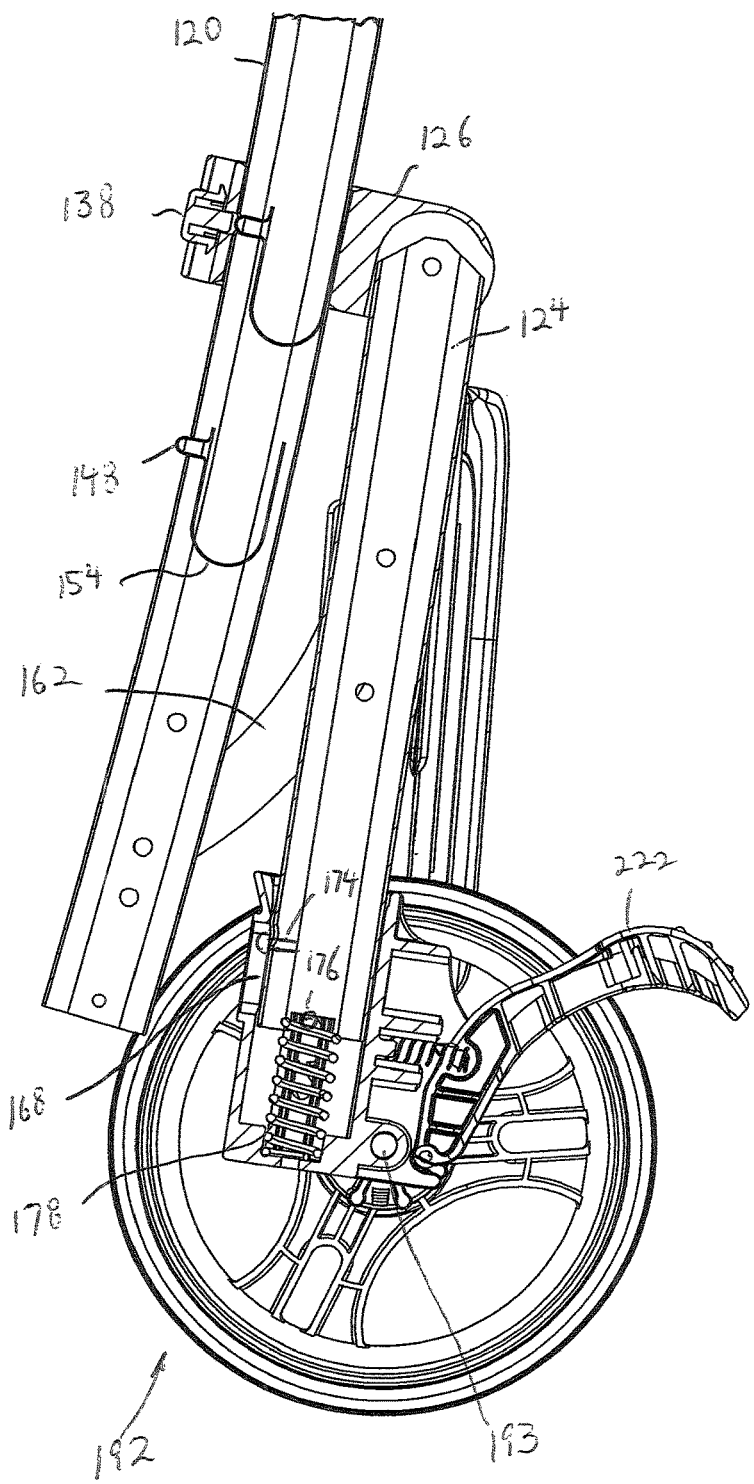
FIG. 28 is a cross-sectional view of the slide member on the rear rod of the frame in its upper position, at the start of a downward sliding movement.
Figure 29:
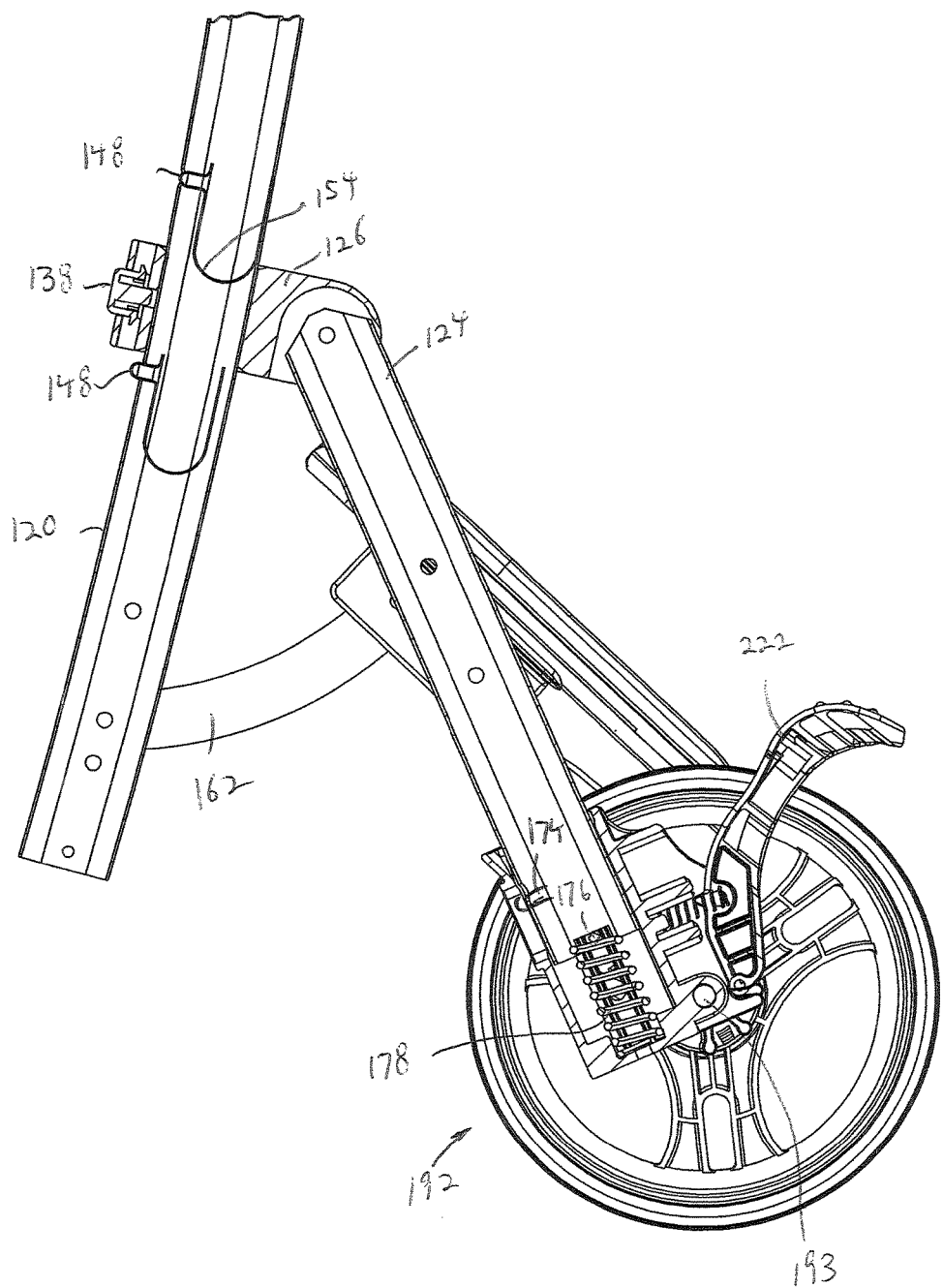
FIG. 29 is a cross-sectional view of the slide member on the rear rod of the frame at a mid-position.
Figure 30:
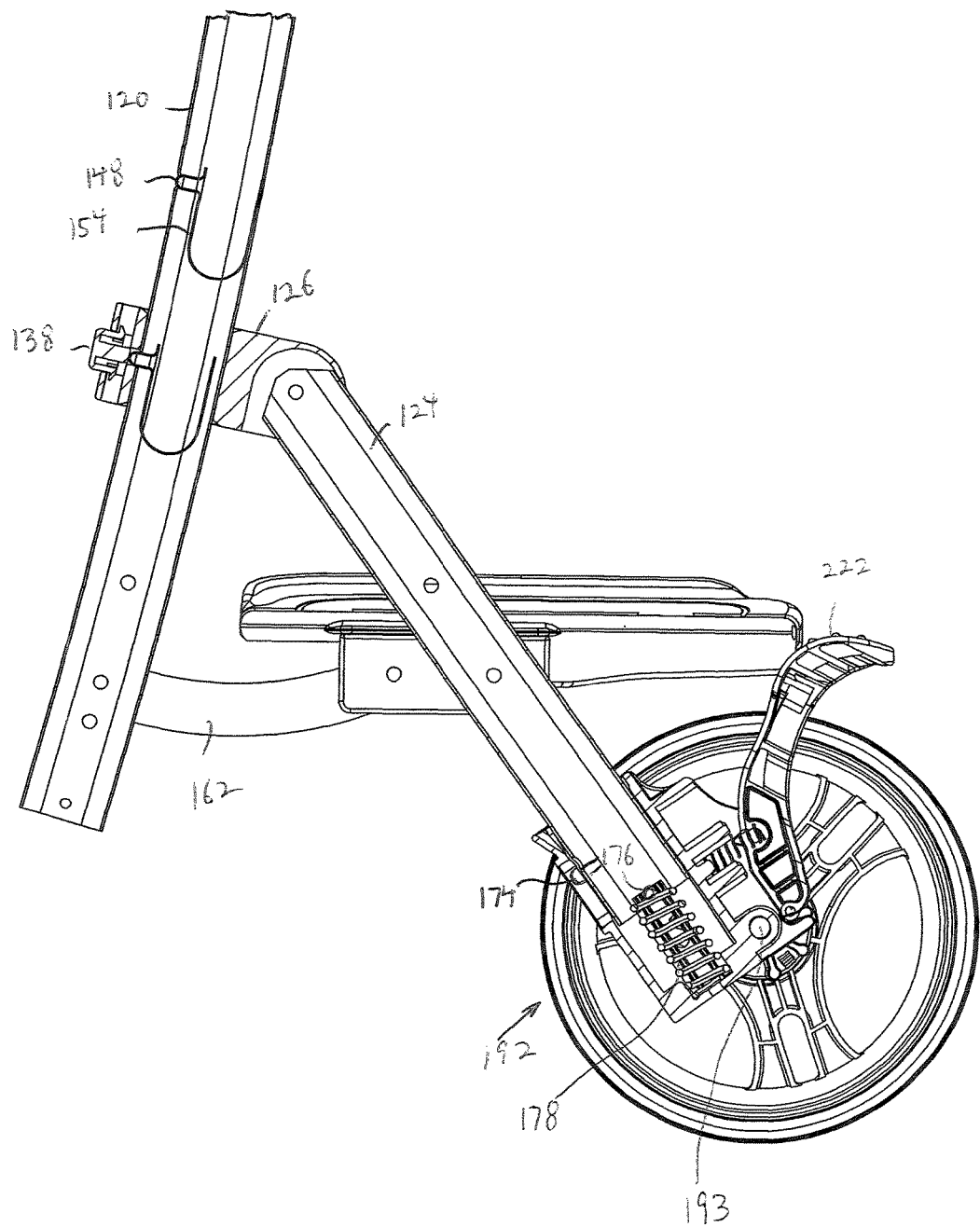
FIG. 30 is a cross-sectional view of the slide member on the rear rod of the frame in its lower secured position.

As shown in FIG. 26, a pushbutton 138 is provided having a cylindrical head 140 with a diameter similar to that of pushbutton recess 132 and slidable therein. An actuator shaft 142 extends from the rear face of cylindrical head 140 and is adapted to be positioned within through opening 136, but is shown in FIG. 26 out of through opening 136. In addition, two stop flanges 144 extend in a diametrically opposite manner from cylindrical head 140 at the inner edge thereof adjacent actuator shaft 142. Stop flanges 144 are positioned within limit openings 137 when cylindrical head 140 is positioned within pushbutton recess 132 so as to limit the pushing in distance of cylindrical head 140, while also preventing escape of cylindrical head 140 from pushbutton recess 132.

In this regard, rear rod 120 includes two vertically spaced apart openings 146 at the lower end thereof. A restraining button 148 is positioned to extend through each opening 146. A U-shaped spring 154 biases the respective restraining button 148 outwardly of the respective opening 146 into through opening 136. Thus, when slide member 126 is slid in covering relation over a restraining button 148, spring 154 biases restraining button 148 outwardly within through opening 136 to releasably lock slide member 126 in that position.

To move slide member 126 to the position of the other restraining button 148, pushbutton 138 is pushed inwardly so that actuator shaft 142 thereof moves restraining button 148 out of engagement with through opening 136, whereupon slide member 126 is no longer restrained and can be moved to the other restraining button 148. Because of the bevel 131, as slide member 126 engages the other restraining button 148, it functions to bias the other restraining button 148 inwardly of rear rod 120 against the force of spring 154, until slide member 126 moves to a position where restraining button 148 is in alignment with through opening 136. At this position, spring 154 biases restraining button 148 into through opening 136, thereby pushing pushbutton 138 outwardly and releasably locking slide member 126 at this position.

In this manner, slide member 126 can be moved between and upper and lower position defined by the two restraining buttons 148. This sequence of events is shown in FIGS. 27-30.

Returning to FIGS. 24 and 25, slide member 126 further includes two parallel, spaced apart arms 156 extending from the end of main body 128 that is opposite pushbutton recess 132, with aligned openings 158 provided at the ends of arms 156 for receiving a pivot pin 160 (FIG. 23) which also extends through an upper opening 161 (FIG. 23A) at the upper end of rear wheel support rod 124 to pivotally secure rear wheel support rod 124 to slide member 126.

A guide link 162 has a lower end pivotally connected to the bottom of rear rod 120 and its upper end pivotally connected to rear wheel support rod 124 at an opening 163 thereof at a position midway of rear wheel support rod 124.

As shown in FIGS. 1 and 31-34 a rear wheel mount housing 164 is secured to the lower end of rear wheel support rod 124. Specifically, rear wheel mount housing 164 includes an elongated tubular body 166 slidably mounted on the lower end of rear wheel support rod 124, and closed at its lower and by a bottom wall 167. Rear wheel mount housing 164 includes a first vertically oriented elongated opening 168 at the front end of elongated tubular body 166 near the upper end thereof, and second and third vertically oriented elongated and aligned openings 170 and 172 at opposite side walls of rear wheel mount housing 164 at positions lower than first vertically oriented elongated opening 168. Each opening 168, 170 and 172 has a circumferential wall 173 with the shape and dimensions of the respective openings 168, 170 and 172 extending outwardly from elongated tubular body 166 in surrounding relation to each opening 168, 170 and 172.

A first rivet 174 (FIGS. 27-30) extends through first vertically oriented elongated opening 168 into a respective opening 175 (FIG. 23A) in rear wheel support rod 124, thereby permitting rear wheel mount housing 164 to slide up and down on rear wheel support rod 124, constrained in such movement by the limits of first rivet 174 in vertically oriented elongated opening 168.

A second rivet 176 (FIGS. 27-30) extends through second and third vertically oriented elongated openings 170 and 172, and is positioned in a lower cut-out section 177 (FIGS. 23A and 27-30) of rear wheel support rod 124. A coil spring 178 is positioned within rear wheel mount housing 164, as shown best in FIGS. 27-30, between second rivet 176 and bottom wall 167 thereof, to normally bias rear wheel support rod 124 upwardly, whereby first rivet 174 is moved to the upper end of first vertically oriented elongated opening 168. However, upon the application of a weight on stroller 10, for example, one or more children thereon, this will force rear wheel support rod 124 to be pushed down into rear wheel mount housing 164, thereby compressing coil spring 178, which thereby functions as a shock absorber.

Two parallel, spaced apart wheel supporting walls 180 extend rearwardly from elongated tubular body 166. Walls 180 are connected together by various reinforcing cross members 182. A lower opening 184 is provided in each wall 180, in alignment with each other, and openings 184 are connected together by an annular reinforcing cylinder 186 between walls 180. A middle opening 188 is provided in each wall 180, in alignment with each other. A cylindrical boss 190 is formed on an outer rear facing surface of the elongated tubular body 166 between middle openings 188 and spaced slightly forwardly therefrom.

Two lower rear wheels 192 are provided, each constructed in an identical manner to wheels 66, described above relative to FIGS. 11, 12 and 18-21. Thus, a wheel axle 193 (FIGS. 27-30) extends through bores 92 of rear wheels, and lower openings 184 and annular reinforcing cylinder 186, to rotatably support wheels 192.

Figure 31:
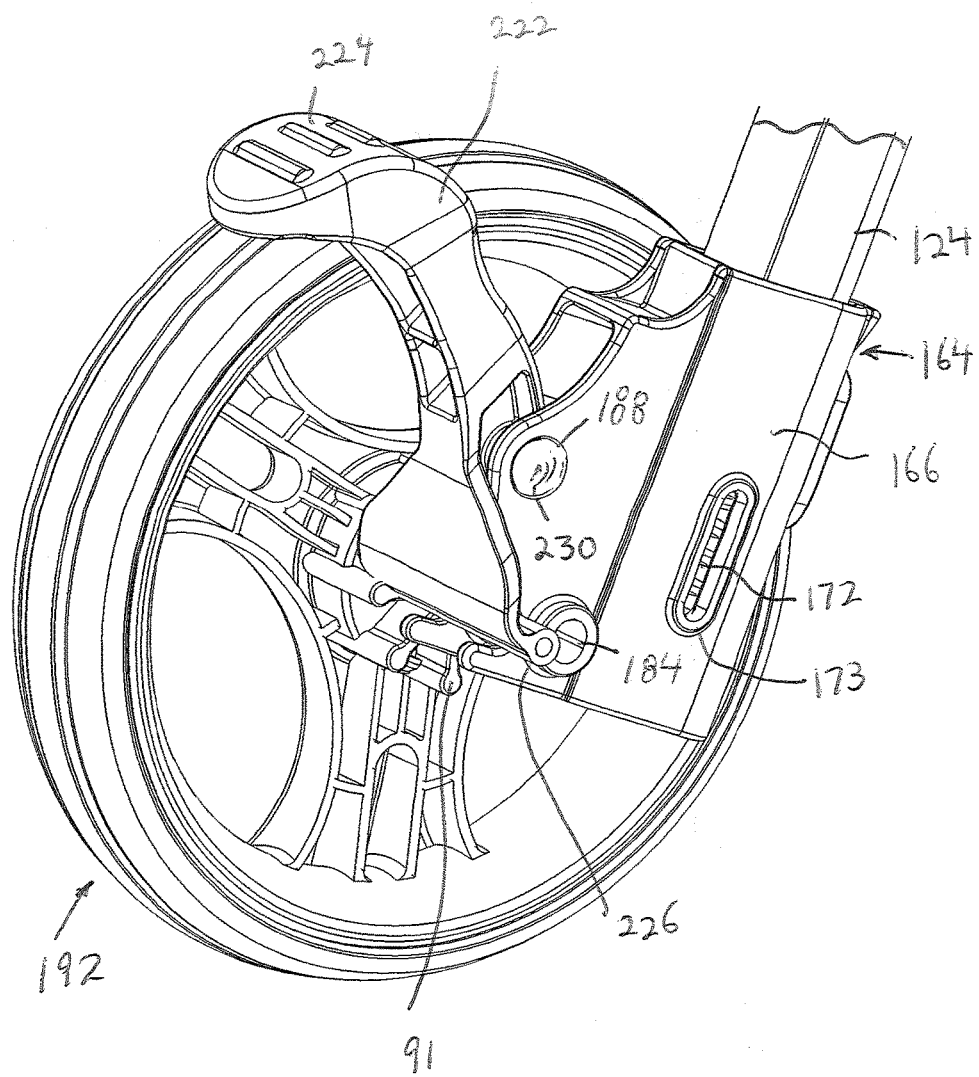
FIG. 31 is a perspective view of one rear wheel mount housing with the outer wheel removed.
Figure 32:
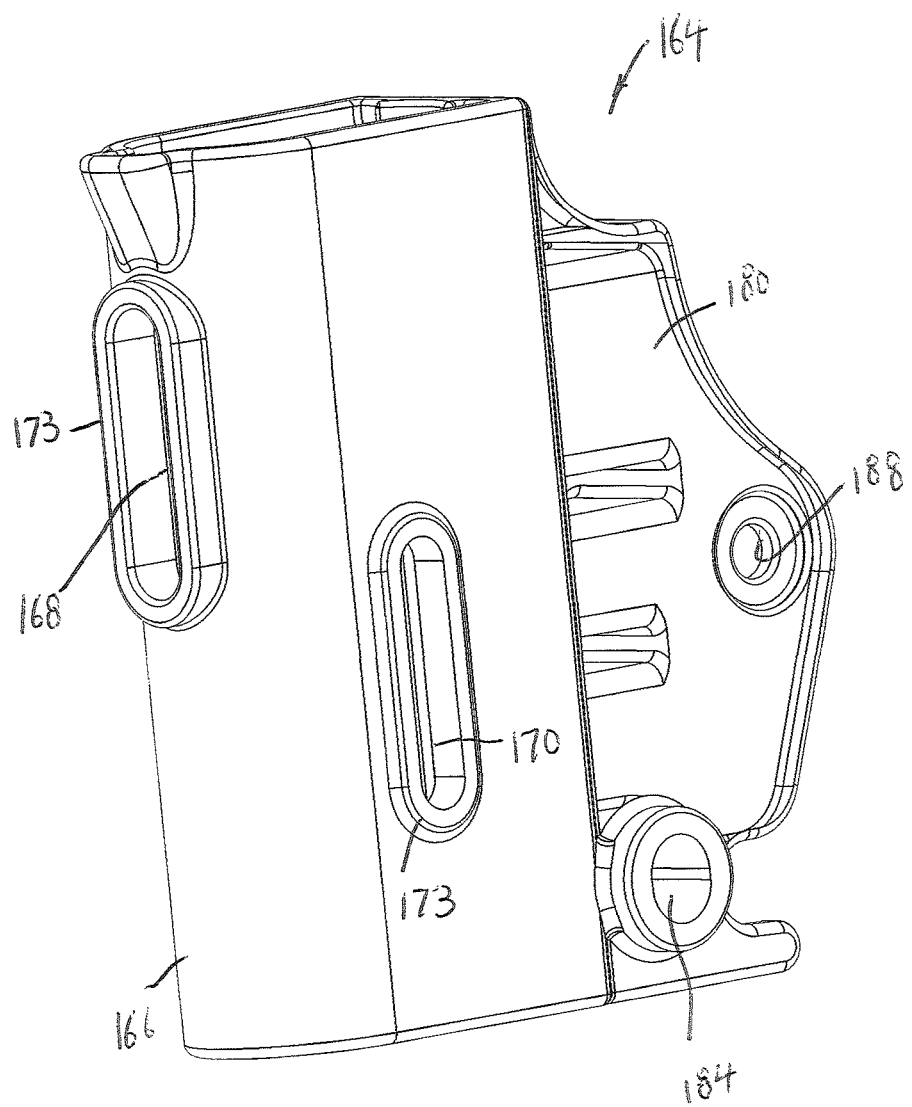
FIG. 32 is a front top perspective view of the rear wheel mount housing.
Figure 33:
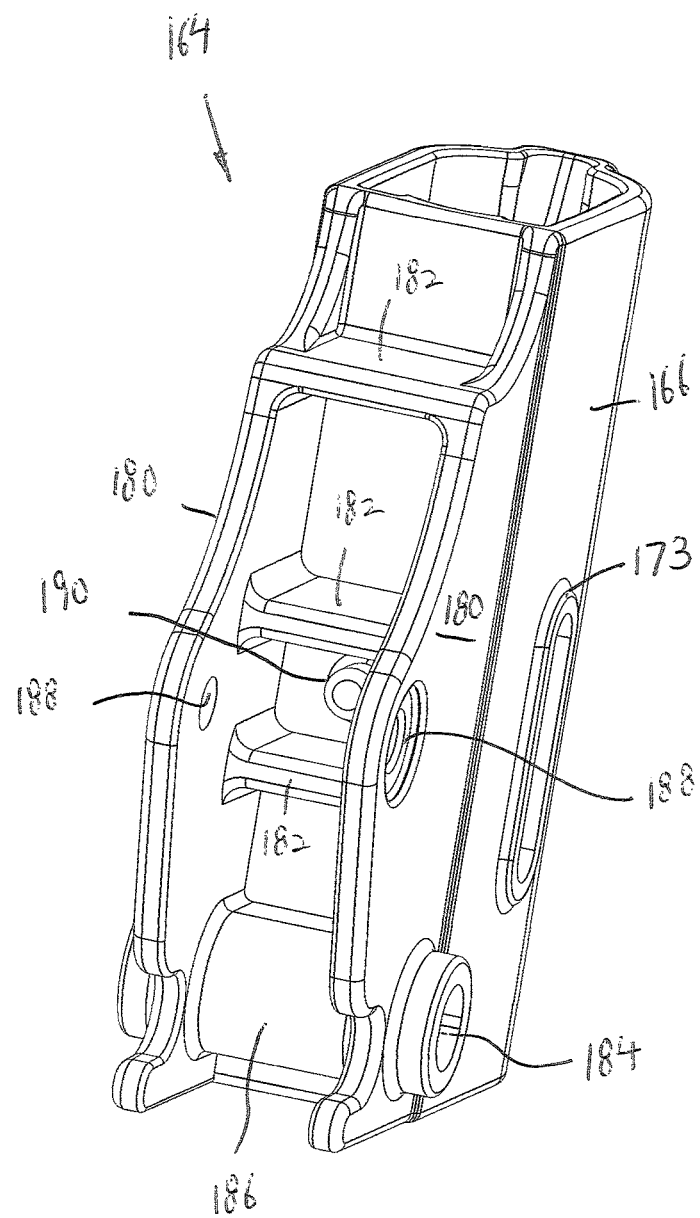
FIG. 33 is a rear top perspective view of the rear wheel mount housing.
Figure 34:
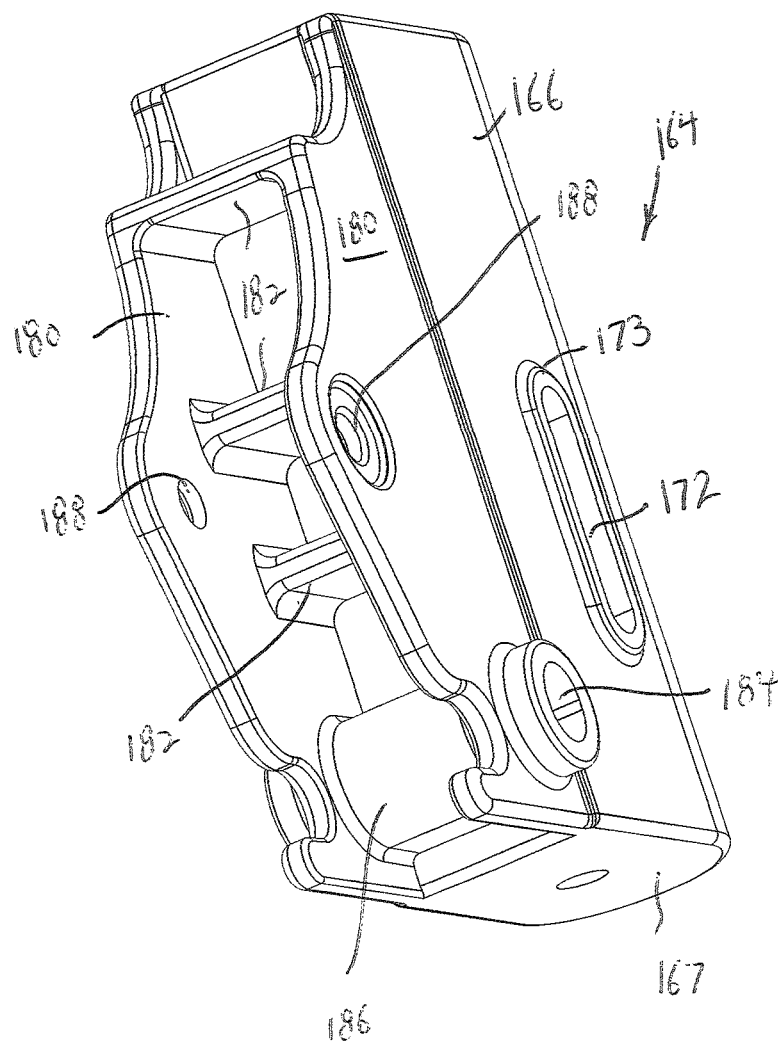
FIG. 34 is a rear bottom perspective view of the rear wheel mount housing.
Figure 35:
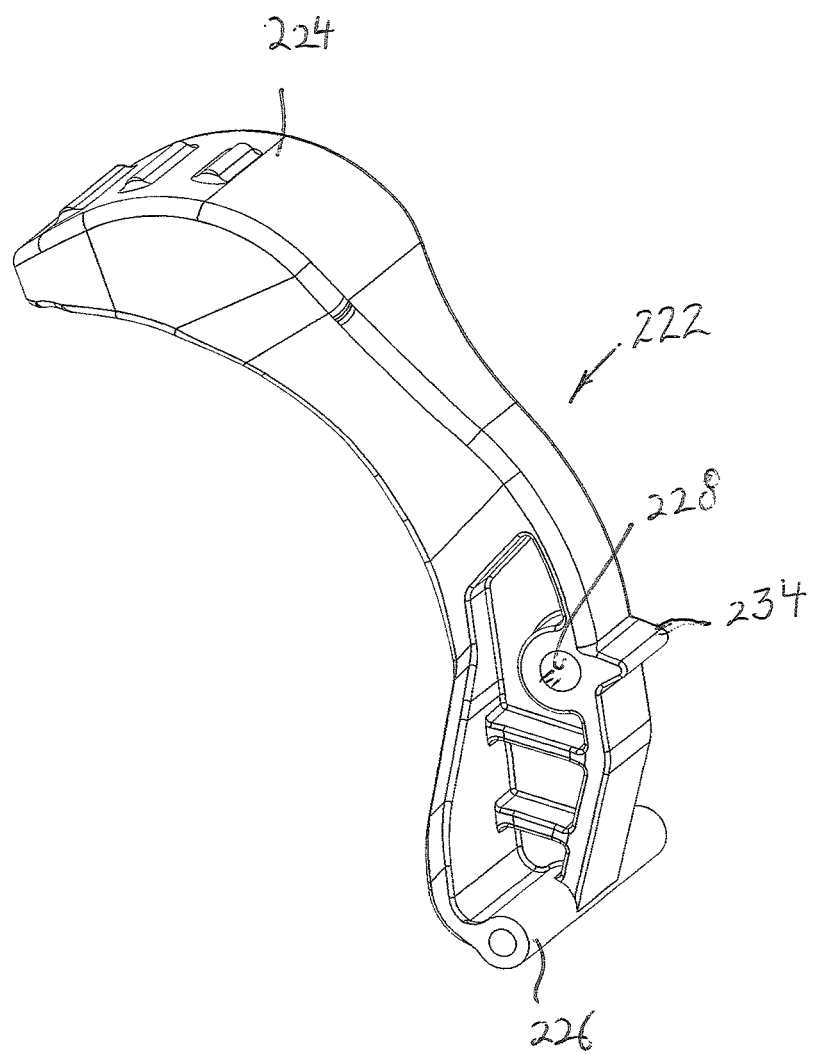
FIG. 35 is a perspective view of the rear brake lever.

As shown in FIGS. 23, 31 and 35, a brake lever 222 is pivotally secured to middle openings 188. Specifically, brake lever 222 includes a lever actuating end 224 and an opposite wheel locking end 226. A transverse opening 228 is provided through brake lever 222 at a position slightly above wheel locking end 226. With this arrangement, a rivet 230 (FIG. 31) pivotally connects brake lever 222 to rear wheel mount housing 164, that is, extends through middle openings 188 and transverse opening 228.

In the wheel locking position, lever actuating end 224 is pushed down so as to move wheel locking end 226 into engagement between two radially extending arms 91 to prevent rotation of lower rear wheels 192. When lever actuating end 224 is pushed up, wheel locking end 226 is moved out of engagement with radially extending arms 91 to permit rotation of lower rear wheels 192.

In order to releasably retain brake lever 222 in the locking and unlocking positions, a coil spring 232 (FIGS. 27-30) is positioned about cylindrical boss 190 at one end and engages a triangular projection 234 on the outer surface of brake lever 222. Thus, when brake lever 222 is moved from the unlocking position to the locking position, it first overcomes the force of coil spring 232, and once it passes a middle null position, and starts moving toward the locking position, coil spring 232 forces wheel locking end 226 into engagement with radially extending arms 91 and maintains brake lever 222 in this position. When brake lever 222 is moved from the locking position to the unlocking position, it first overcomes the force of coil spring 232, and once it passes the middle null position, and starts moving toward the unlocking position, coil spring 232 forces wheel locking end 226 out of engagement with radially extending arms 91 and maintains brake lever 222 in this position.

As shown in FIG. 1, each of left side support frame 12 and right side support frame 14 further includes a handle 236. Handle 236 includes a first tube section 238 fixed to the upper end of rear rod 120, an upper gripping rod 240, which is preferably bent into a curved shape and a rotatable connector 242 which connects together the upper end of first tube section 238 and the lower and of upper gripping rod 240. Rotatable connector 242 is shown in a first operative position in FIG. 1, but can provide for rotation of upper gripping rod 240 relative to first tube section 238 to adjust the position of upper gripping rod 240 for each individual, by means of rotatable connector 242.

As shown best in FIGS. 1-9, connecting frame 16 includes a lower scissor frame 250 having a first scissor rod 252 with one end pivotally connected to left side lower front rod 20 and the other end pivotally connected to the lower end of right side rear rod 120. Lower scissor frame 250 further includes a second scissor rod 254 with one end pivotally connected to right side lower front rod 20 and the other end pivotally connected to the lower end of left side rear rod 120. First and second scissor rods 252 and 254 overlap each other at a center point, and are pivotally secured to each other at the center point by a pivot pin 256.

A bent rod 258 has a rear rod section 260 which is bent at an angle of about 135°, approximately at a center position of bent rod 258 relative to a front rod section 262 thereof. Each rear rod section 260 has a free end pivotally connected to the lower end of the respective left and right side rear rods 120, immediately above the connection of scissor rods 252, 254 thereto. In the open, operative configuration of the stroller, rear rod section 260 is angled upwardly towards the front of the stroller.

Front rod section 262 extends from the rear rod section 260 at the center position, in a horizontal orientation in the open, operative configuration of the stroller, to a position extending forwardly of the respective left or right side lower front rod 20. At the position where front rod section 262 meets lower front rod 20, front rod section 262 is pivotally secured to the lower front rod 20.

The two front rod sections 262 at opposite sides of the stroller form a seat support assembly 268.

A seatback support assembly 270 is connected to left and right side bent rods 258. Specifically, seatback support assembly 270 includes a seatback support rod 272 on each side of stroller 10, pivotally connected at a lower end to a respective left and right side front rod section 262 adjacent the center position of the bent rod 258, and extending upwardly and rearwardly therefrom in the open, operative position of the stroller, as shown in FIGS. 1-5.

A seatback scissor assembly 274 connects together left and right side seatback support rods 272. Specifically, seatback scissor assembly 274 includes two elongated bars 276, each having its lower end pivotally connected to the lower end of a respective left and right side seatback support rod 272. Each elongated bar 276 extends upwardly at an angle of approximately 45 degrees toward the opposite side seatback support rod 272, with its upper free end at a slightly lower vertical position than the upper end of each support rod 272 and spaced slightly inwardly from the respective support rod 272. A short connecting bar 278 is oriented horizontally in the open, operative position of the stroller, and has one end pivotally connected to the upper free end of each elongated bar 276 and the opposite end pivotally connected to the adjacent left or right back support rod 272 at a position spaced slightly from the upper end thereof.

The two elongated bars 276 are pivotally connected together by a pivot pin 280 in overlapping relation at a position approximately one third of the distance from the upper ends thereof.

Although not shown, a fabric covering is secured to and extends across second rod sections 262 of seat support assembly 268 in a stretched manner so as to provide a seat for a child. The same fabric covering also extends over seatback support assembly 270 to provide a backrest for the child. Because of the connection of the fabric covering to second rod sections 262, the fabric covering limits the reclining angle of seatback support assembly 272 to an angle of about 45 degrees in the open, operative position of the stroller.

As shown best in FIG. 23, connecting frame 16 further includes a rear connecting frame assembly 282 which connects together the lower ends of left and right rear rods 120.

Specifically, rear connecting frame assembly 282 includes a left side lower bar 284 having one end pivotally connected to the lower end of left side rear rod 120 and extending horizontally toward the right side rear rod 120 in the open, operative position of the stroller. Rear connecting frame assembly 282 further includes a right side lower bar 284 having one end pivotally connected to the lower end of the right side rear rod 120 and extending horizontally toward the left side rear rod 120 in the open, operative position of the stroller. A pivot pin 286 pivotally connects together the inner ends of the left and right side lower bars 284.

In addition, the lower end of a vertical connecting bar 288 is also pivotally connected to pivot pin 286 to the rear of lower bars 284, and a control pedal 290 is also connected to pivot pin 286 to the rear of vertical bar 288.

Rear connecting frame assembly 282 includes a left side upper left bar 294 having one end pivotally connected to the lower end of left side rear rod 120 at a position spaced above left side lower bar 284 and extending horizontally toward the right side rear rod 120 in the open, operative position of the stroller. Rear connecting frame assembly 282 further includes a right side upper bar 294 having one end pivotally connected to the lower end of the right side rear rod 120 at a position spaced above the right side lower bar 284 and extending horizontally toward the left side rear rod 120 in the open, operative position of the stroller. A pivot pin 296 pivotally connects together the inner ends of the left and right side upper bars 294.

In addition, the upper end of vertical connecting bar 288 is pivotally connected to pivot pin 296 to the rear of upper bars 294, with pivot pins 286 and 296 moving in synchronism with each other.

Rear connecting frame assembly 282 includes a left side intermediary bar 304 having one end pivotally connected to the lower end of the left side rear rod 120 at the same pivot position as the left side lower bar 284, and a right side intermediary bar 304 having one end pivotally connected to the lower end of the right side rear rod 120 at the same pivot position as the right side lower bar 284.

Figure 36:
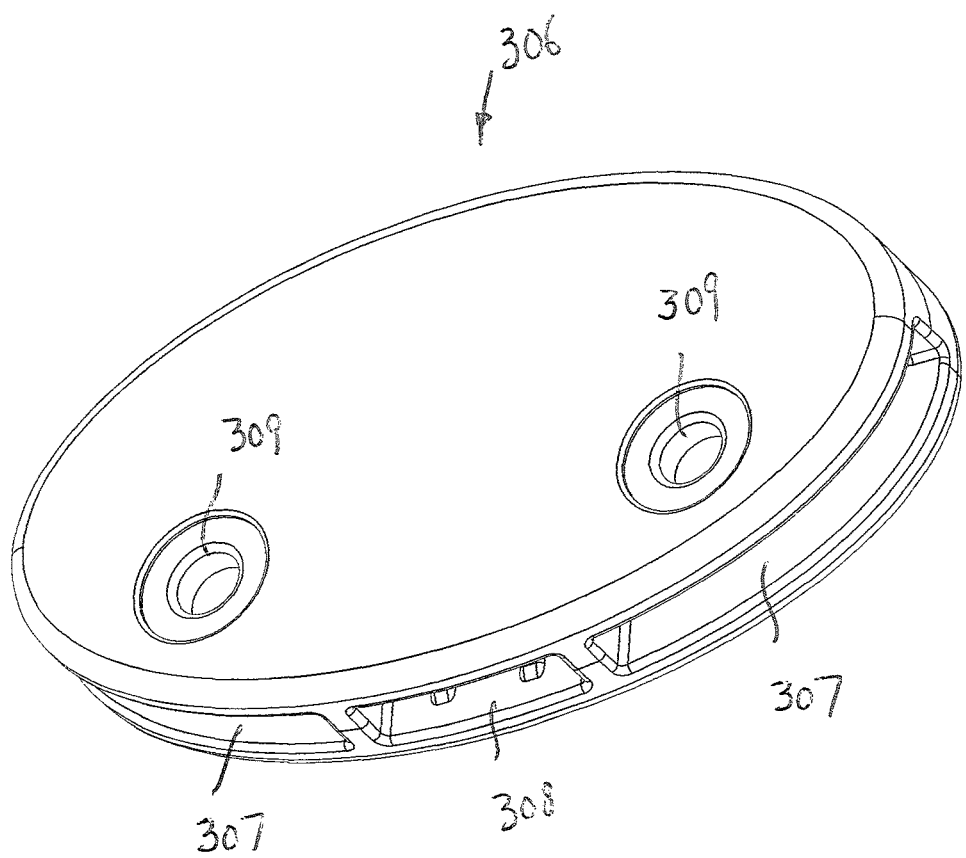
FIG. 36 is a perspective view of the slide member of the rear connecting frame assembly.
Figure 37:
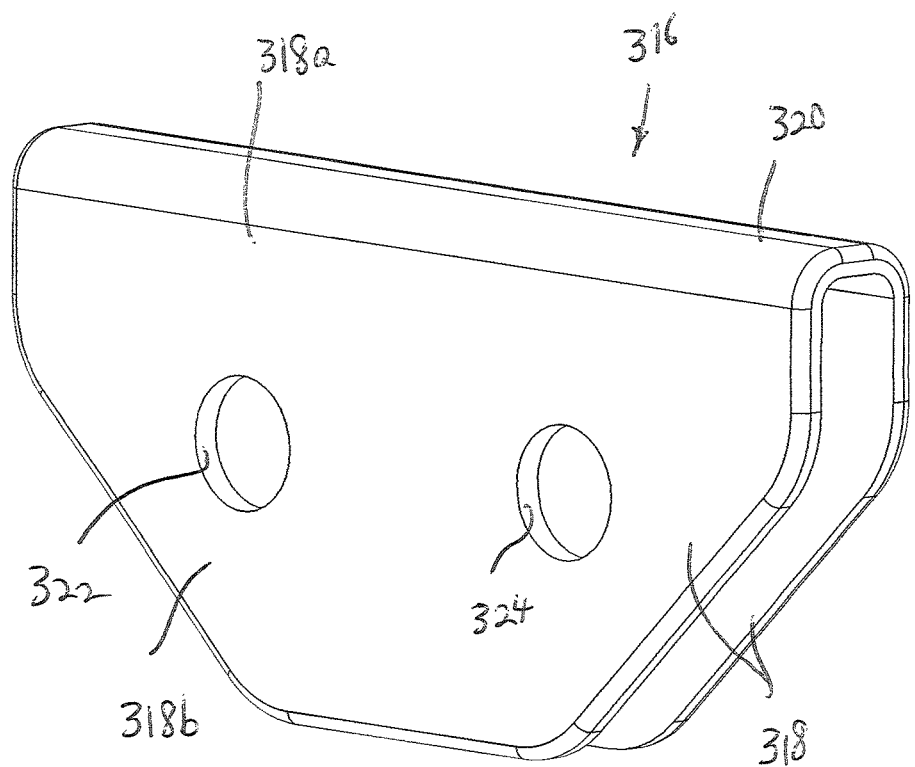
FIG. 37 is a perspective view of the pivot housing of the locking arrangement of the rear connecting frame assembly.

The opposite ends of intermediary bars 304 are pivotally connected to opposite sides of an oval shaped slide member 306 (FIGS. 23 and 36) having a through vertical opening 308 through which vertical connecting bar 288 extends so that slide member 306 is slidably positioned on vertical connecting bar 288. Slide member 306 includes left and right side lower recesses 307 through which the opposite free ends of intermediary bars 304 extend, and transverse openings 309 for pivotally connecting the inner free ends of intermediate bars 304 to slide member 306 by means of rivets 311.

Lastly, as also shown in FIG. 23, rear connecting frame assembly 282 includes a locking arrangement 310 which maintains the stroller in the open, operative position when control pedal 290 is pressed to its lowermost position in which the left and right side lower bars 284, and the left and right side upper bars 294, are co-linear in a horizontal arrangement to a ground surface.

Specifically, locking arrangement 310 includes a left side locking bar 312 having one end pivotally connected to the left side rear rod 120 at a position immediately above the pivot for the left side lower bar 284, and a right side locking bar 312 having one end pivotally connected to the right side rear rod 120 at a position immediately above the pivot for the right side lower bar 284. The outer end of the left side locking bar 312 extends slightly outwardly of the left side rear rod 122 to form a push down engagement 314.

Locking arrangement 310 further includes a pivot housing 316 which pivotally connects together opposite inner ends of the left and right side locking bars 312. Specifically, locking arrangement 310 includes two spaced apart, parallel plates 318 connected at their upper ends by a top plate 320. Preferably, plates 318 and 320 are formed as a one-piece, unitary member. Each plate 318 has an upper rectangular section 318a and a lower trapezoidal section 318b. The upper ends of rectangular sections 318a are connected together by top plate 320. In addition, each plate 318 includes two horizontally spaced apart openings 322 and 324, with openings 322 in both plates 318 being in alignment and openings 324 in both plates 318 being in alignment.

Openings 322 and 324 are spaced inwardly from lateral edges of plates 318. Because of this arrangement, when control pedal 290 is pressed down to its lowermost position in which the left and right side lower bars 284, and the left and right side upper bars 294, are co-linear in a horizontal arrangement to a ground surface, the left and right side locking bars 312 are also moved to a co-linear position in a horizontal arrangement to the ground surface. When moving the stroller to a closed or storage configuration, control pedal 290 is moved upwardly by the user. However, in such case, the inner ends of the left and right side locking bars 312 abut against top plate 320, thereby preventing further upward movement of control pedal 290, and preventing collapse of the stroller. In such case, push down engagement 314 of the left side locking bar 312 must also be pushed down in order to pivot the left and right side locking bars 312 relative to pivot housing 316, which then permits further upward movement of control pedal 290 in order to completely collapse the stroller. Thus, locking arrangement 310 functions as a safety arrangement to prevent inadvertent collapse of the stroller.

In accordance with an important aspect of the present invention, the present invention is provided with left and right side standing footboards 330 at the rear of the stroller upon which an older child can stand while a younger child is seated within the stroller. With the present invention, however, standing footboards 330 can only be positioned for standing when the rear wheels 192 are moved rearwardly of the stroller to increase the footprint of the stroller.

Specifically, as shown best in FIGS. 2 and 38-47, each standing footboard 330 includes an outer footboard standing section 332 and an inner footboard standing section 334 pivotally connected to outer footboard standing section 332, with outer standing section 332 pivotally secured to a respective rear rod 120 by a pivoting support housing 336.

Figure 40:
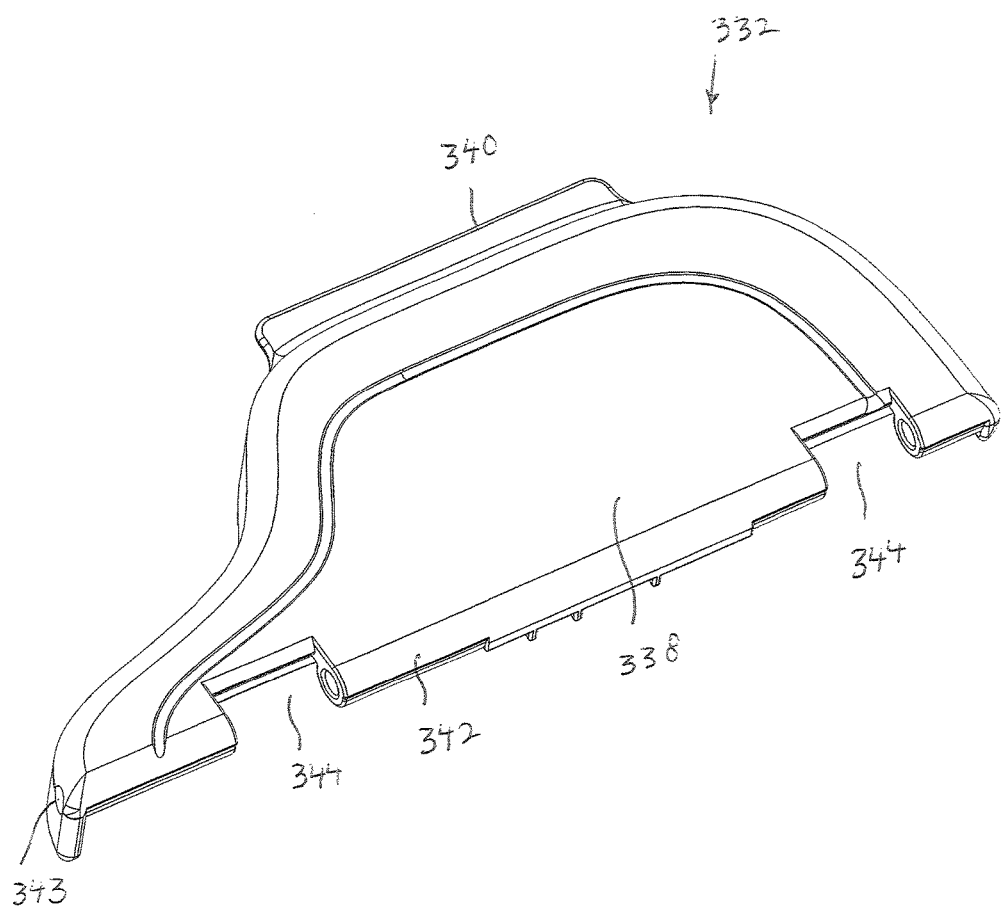
FIG. 40 is a top perspective view of the outer footboard standing section of the standing footboard.
Figure 41:
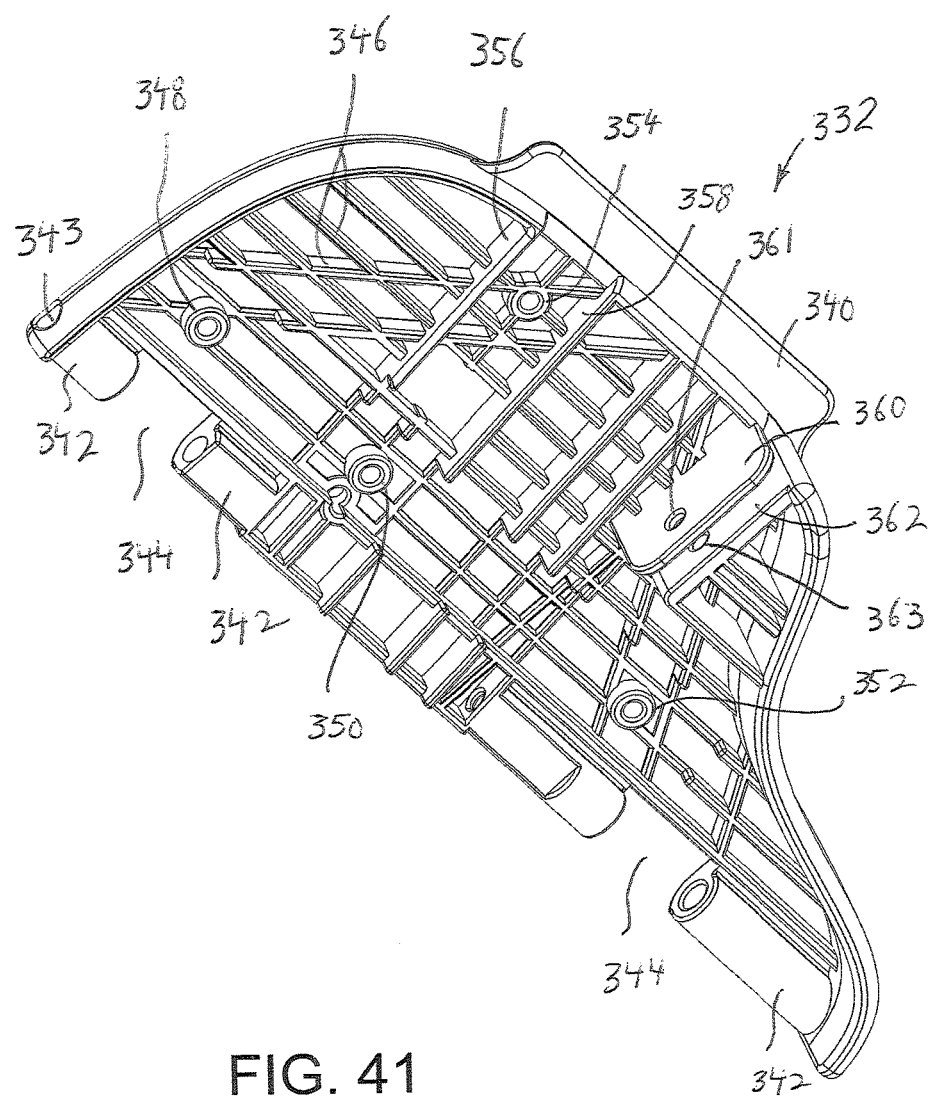
FIG. 41 is a bottom perspective view of the outer footboard standing section of the standing footboard.

As shown best in FIGS. 40 and 41, outer footboard standing section 332 has a generally planar upper surface 338 for standing. The outer edge of outer footboard standing section 332 includes a generally rectangular support flange 340, while the inner edge terminates in a hollow cylinder 342 extending therealong. Two spaced apart cut-out sections 344 are provided in hollow cylinder 342. In addition, opposite ends of hollow cylinder 342 are open at 343 for receiving a hinge pin 368 (FIG. 38) therein.

The underside of outer footboard standing section 332 is provided with a plurality of reinforcing ribs 346 extending downwardly therefrom in a criss-crossing manner. Three threaded bosses 348, 350 and 352 extend downwardly from the underside in a linear arrangement generally parallel to and spaced slightly outwardly of hollow cylinder 342. A fourth threaded boss 354 extends downwardly from the underside spaced apart slightly inwardly of the outer edge of outer footboard standing section 332 such that an imaginary line connecting threaded bosses 350 and 354 is generally perpendicular to an imaginary line connecting threaded bosses 348, 350 and 352.

Outer footboard standing section 332 further includes two parallel, spaced apart guiding walls 356 and 358 extending from the underside thereof on opposite sides of fourth threaded boss 354 and extending in parallel, offset relation to the imaginary line connecting threaded bosses 350 and 354. Two further parallel, spaced apart guiding walls 360 and 362 also extend from the underside of outer footboard standing section 332 adjacent the outer edge of outer footboard standing section 332. Guiding walls 360 and 362 include aligned openings 361 and 363, respectively. Guiding walls 360 and 362 extend downwardly to a greater extent than guiding walls 356 and 358, and are offset closer to threaded boss 352 than guiding walls 356 and 358 in the lengthwise direction of outer footboard standing section 332.

Figure 42:
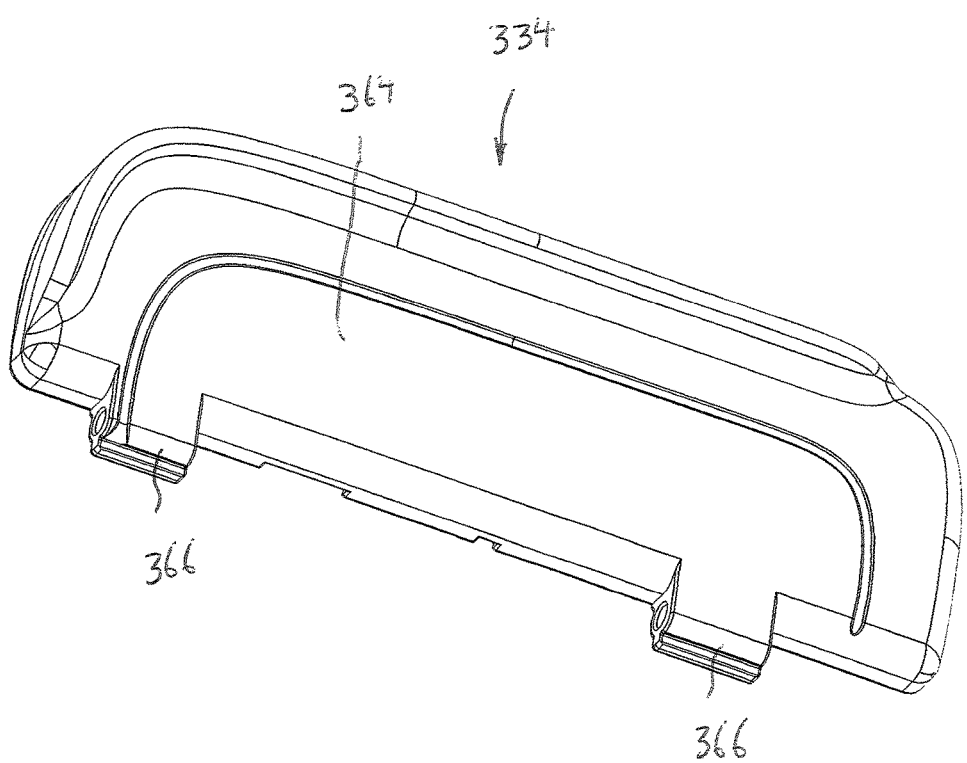
FIG. 42 is a top perspective view of the inner footboard standing section of the standing footboard.
Figure 43:
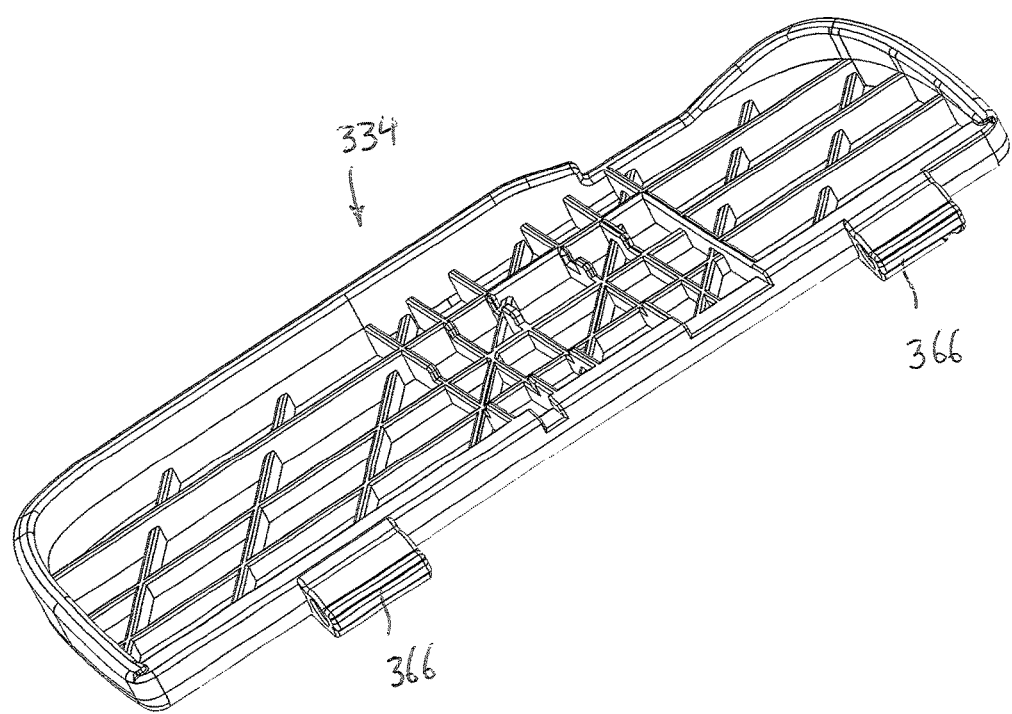
FIG. 43 is a bottom perspective view of the inner footboard standing section of the standing footboard.

As best shown in FIGS. 42 and 43, inner footboard standing section 334 has a generally rectangular configuration with a generally planar upper surface 364 for standing. When outer footboard standing section 332 and inner footboard standing section 334 are in the operative standing mode, upper surfaces 338 and 364 are coplanar for supporting a child's foot thereon.

The outer edge of inner footboard standing section 334 includes two spaced apart, hollow cylindrical barrels 366 which fit within cut-out sections 344 of hollow cylinder 342 with the openings thereof in alignment. As a result, hinge pin 368 (FIG. 38) is inserted through an opening 343 and extends through the central openings of hollow cylinder 342 and cylindrical barrels 366 so as to hingedly connect inner footboard standing section 334 to outer footboard standing section 332.

Figure 44:
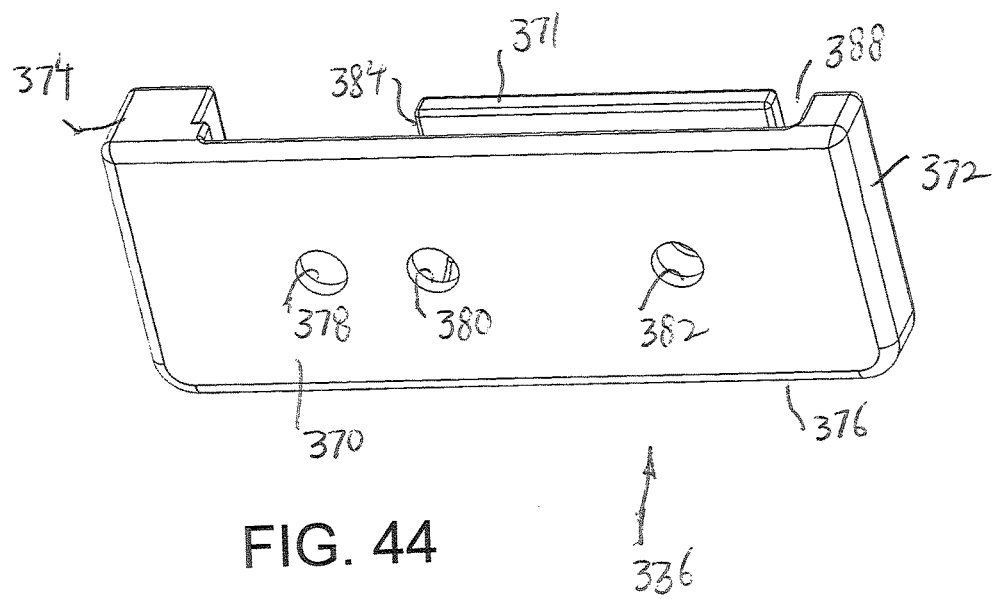
FIG. 44 is a front perspective view of the pivoting support housing of the standing footboard.
Figure 45:
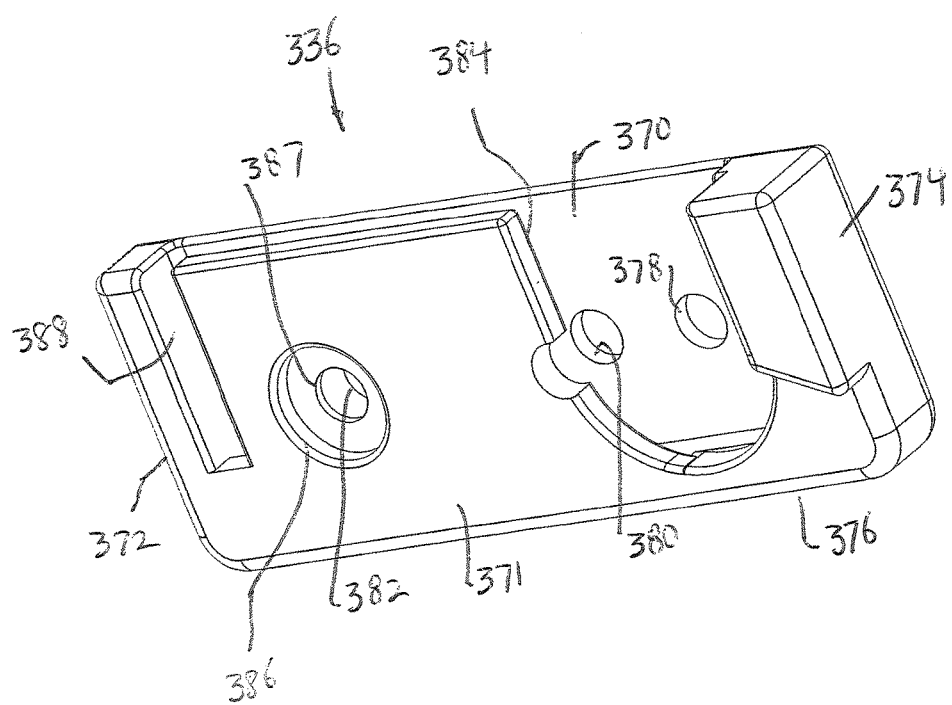
FIG. 45 is a rear perspective view of the pivoting support housing of the standing footboard.

As shown best in FIGS. 44 and 45, pivoting support housing 336 includes two parallel, spaced apart rectangular front and rear walls 370 and 371 connected together by opposite side walls 372 and 374, and a lower wall 376, to define a cavity 377 therein.

Front wall 370 includes three co-linearly arranged openings 378, 380 and 382 therein, with two openings 378 and 380 being positioned close to each other, and opening 382 being positioned a further distance away from the other openings 378 and 380.

Rear wall 371 includes a large archway opening 384 that overlaps openings 378 and 380, and which is open at the upper edge of rear wall 371. Rear wall 371 further includes a recess 386 in coaxial overlapping relation with opening 382, but having a larger diameter, with a smaller diameter opening 387 in the bottom wall of recess 386 which is coaxial with opening 382. Finally, an elongated vertical slot-like opening 388 is provided between opening 386 and side wall 372, and is open at the upper edge of rear wall 371.

Figure 38:
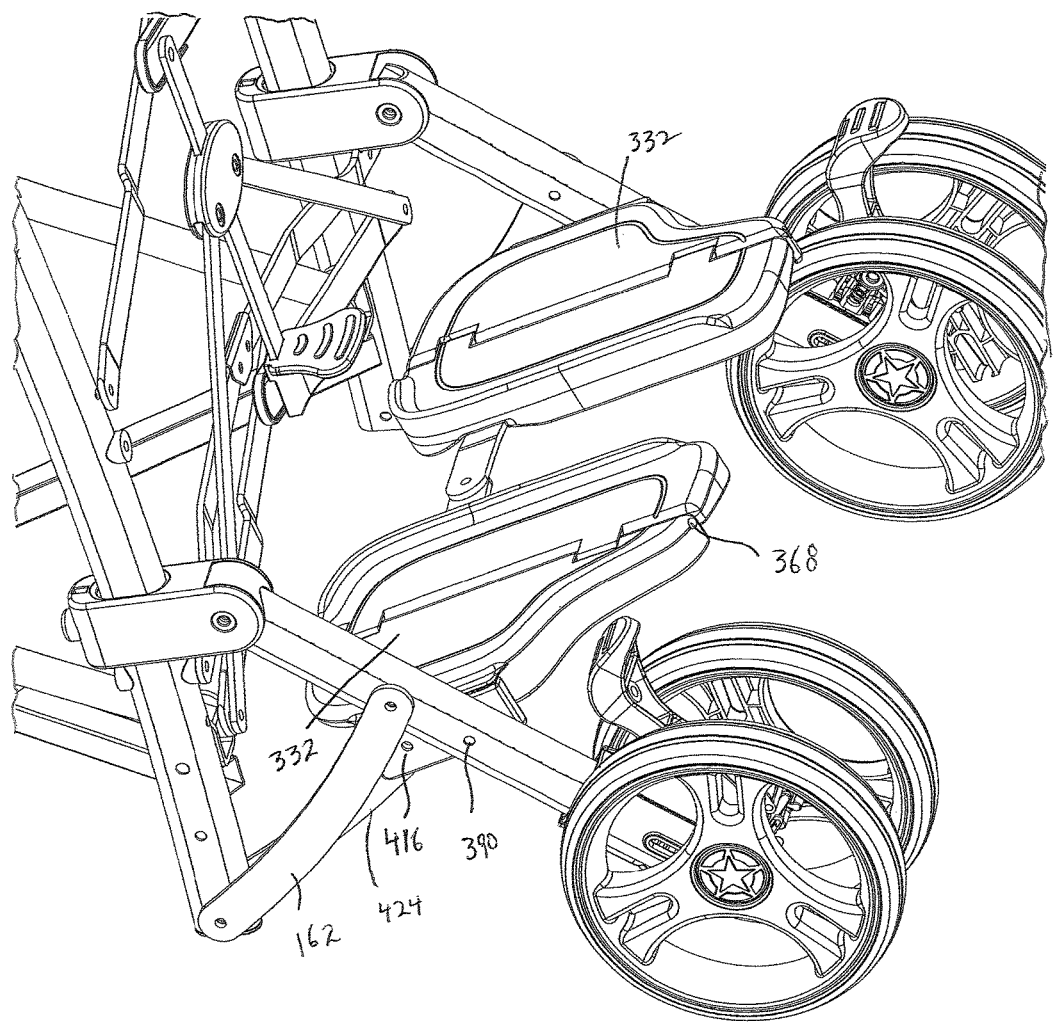
FIG. 38 is a perspective view showing the standing footboard.

Pivoting support housing 336 is pivotally mounted to a respective rear wheel support rod 124 by a rivet 390 (FIG. 38).

Figure 39:
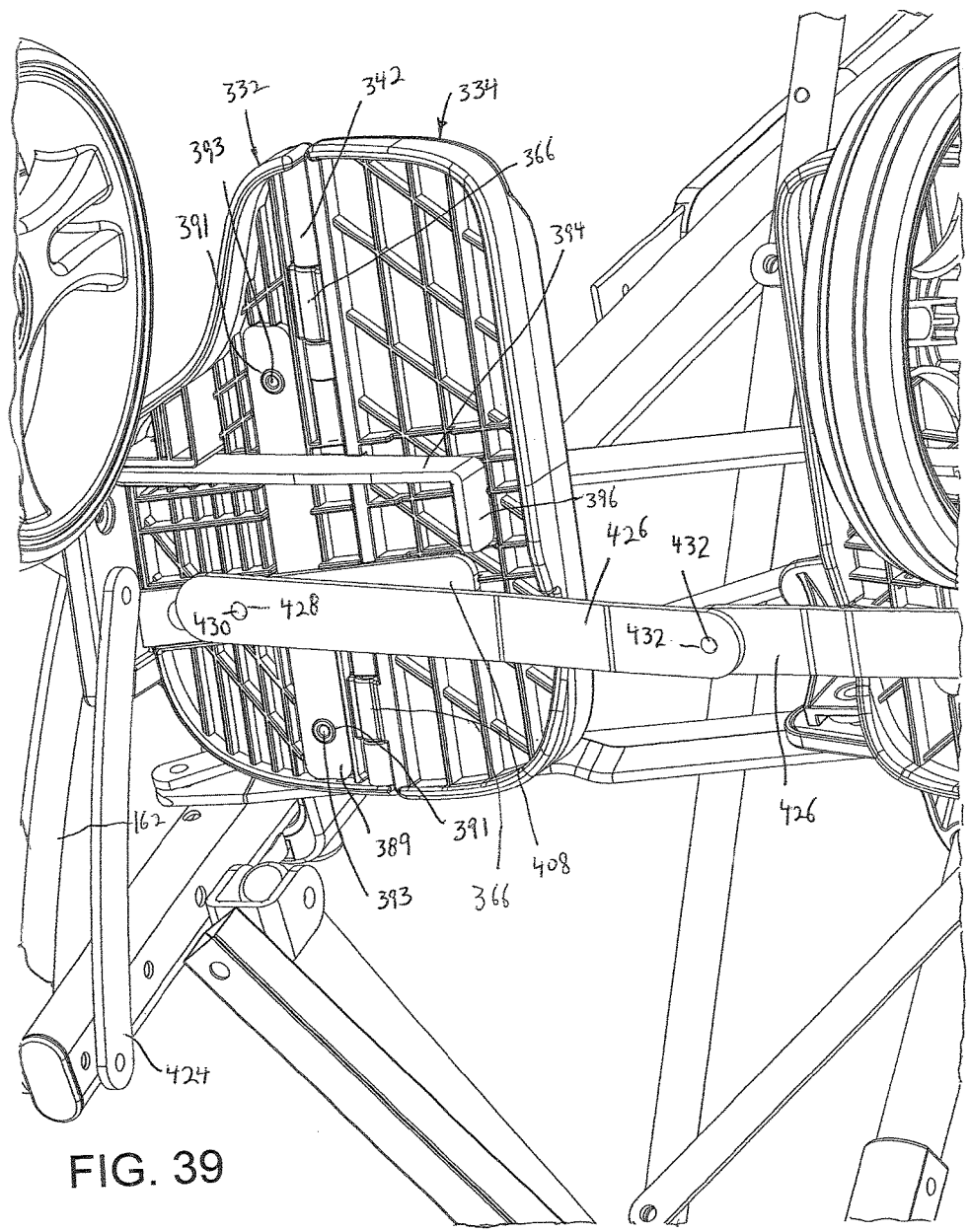
FIG. 39 is a bottom perspective view of one side standing footboard.

As shown in FIG. 39, a reinforcing bar 389 extends across the underside of outer footboard standing section 332 and over openings 348, 350 and 352. Reinforcing bar 389 includes three openings 391 which are in alignment with openings 348, 350 and 352, with rivets 393 inserted within the outer openings 391, 348 and 391, 352 to secure reinforcing bar 389 to the underside of outer footboard standing section 332.

Figure 46:
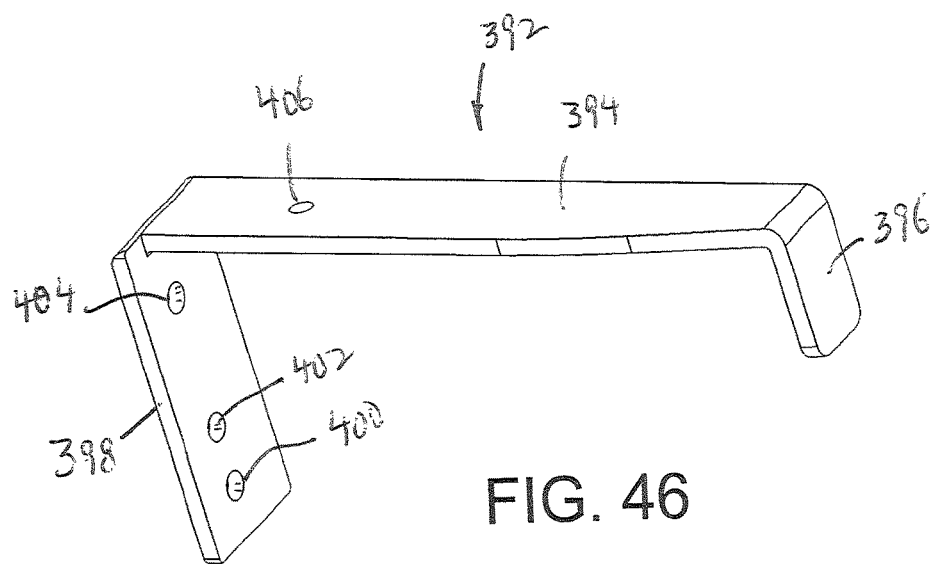
FIG. 46 is a perspective view of the first support bar of the standing footboard.

A first support bar 392, shown best in FIGS. 39 and 46, includes an elongated central bar 394 having a short bent end 396 at one end which extends at a right angle to central bar 394 and a longer bent end 398 at the opposite end which extends in the same direction as short bent end 396. Longer bent end 398 includes three co-linearly arranged openings 400, 402 and 404 which are spaced apart by the same distances as openings 378, 380 and 382. A further opening 406 is provided in central bar 394 at a position closer to longer bent end 398.

In this manner, longer bent and 398 extends within cavity 377 of pivoting support housing 336, with central bar 394 extending out slot-like opening 388. In such condition, support flange 340 of outer footboard standing section 332 rests on the upper open and of pivoting support housing 336, with central bar 394 extending between guiding walls 360 and 362. A screw, rivet or the like is inserted through openings 361 and 363 and opening 406 to secure central bar 394 to pivoting support housing 336. It will be appreciated that central bar 394 extends past the inner edge of outer footboard standing section 332 and below inner footboard standing section 334, to support both sections 332 and 334. At the same time, rivet 390 also extends through opening 404 of central bar 394. It will further be appreciated that in such arrangement, central bar 394 extends perpendicular to upper surface 338 of outer footboard standing section 332.

Figure 47:
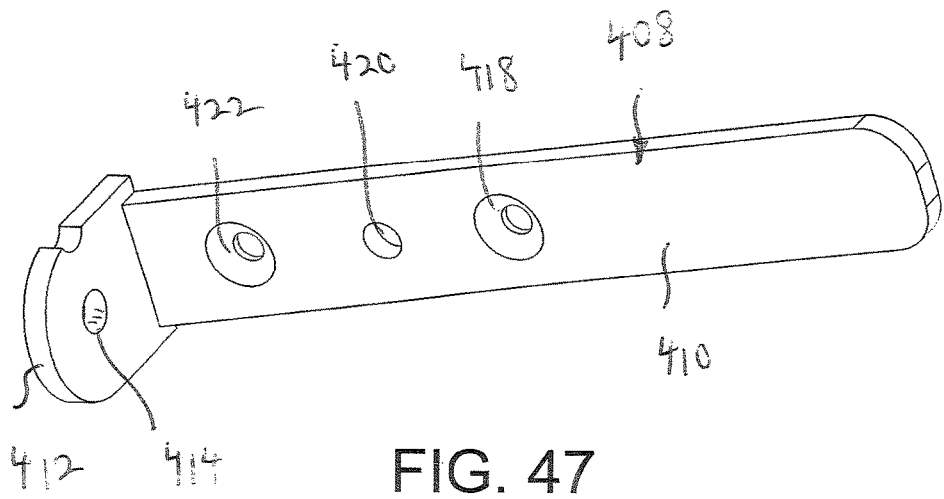
FIG. 47 is a perspective view of the second support bar of the standing footboard.

A second support bar 408, best shown in FIGS. 39 and 47, includes an elongated bar 410 and a short bent end 412 at one end thereof. Short bent end 412 has the same archway shape and dimensions as large archway opening 384 for fitting therein, and extends coplanar with rear wall 371. Short bent end 412 has an opening 414 therein which is in alignment with opening 400 of first support bar 392 and opening 378 of pivoting support housing 336. A rivet 416 (FIG. 39) extends through these openings to secure short bent end 412, first support bar 392 and pivoting support housing 336 together in a fixed manner.

With such securement, elongated bar 410 of second support bar 408 extends between guiding walls 356 and 358 to a position past the inner edge of outer footboard standing section 332, and below inner footboard standing section 334, to support both sections 332 and 334. Elongated bar 410 includes three spaced apart openings 418, 420 and 422, with openings 418 and 422 being in alignment with openings 350 and 354, respectively. Rivets (not shown) extend through openings 418, 350 and openings 422, 354, to secure elongated bar 410 to the underside of outer footboard standing section 332.

A linkage bar 424 has one end pivotally connected to the lower end of the respective rear rod 120 and the opposite end pivotally connected with pivoting support housing 336 through opening 380 thereof by a rivet, which also extends through opening 402 of first support bar 392.

Finally, a third support bar 426 has an opening 428 at one end thereof which is in alignment with opening 420 of second support bar 408 and which are connected together by a rivet 430. The opposite end of third support bar 426 includes an opening 432 which is in overlapping alignment with the opening 432 of the third support for at the opposite side of the stroller and which are connected together by a rivet 432. This provides further support and stability for standing footboard 330. However, it will be appreciated that third support bars 426 can be eliminated without seriously affecting the support of standing footboard 330.

Figure 4:
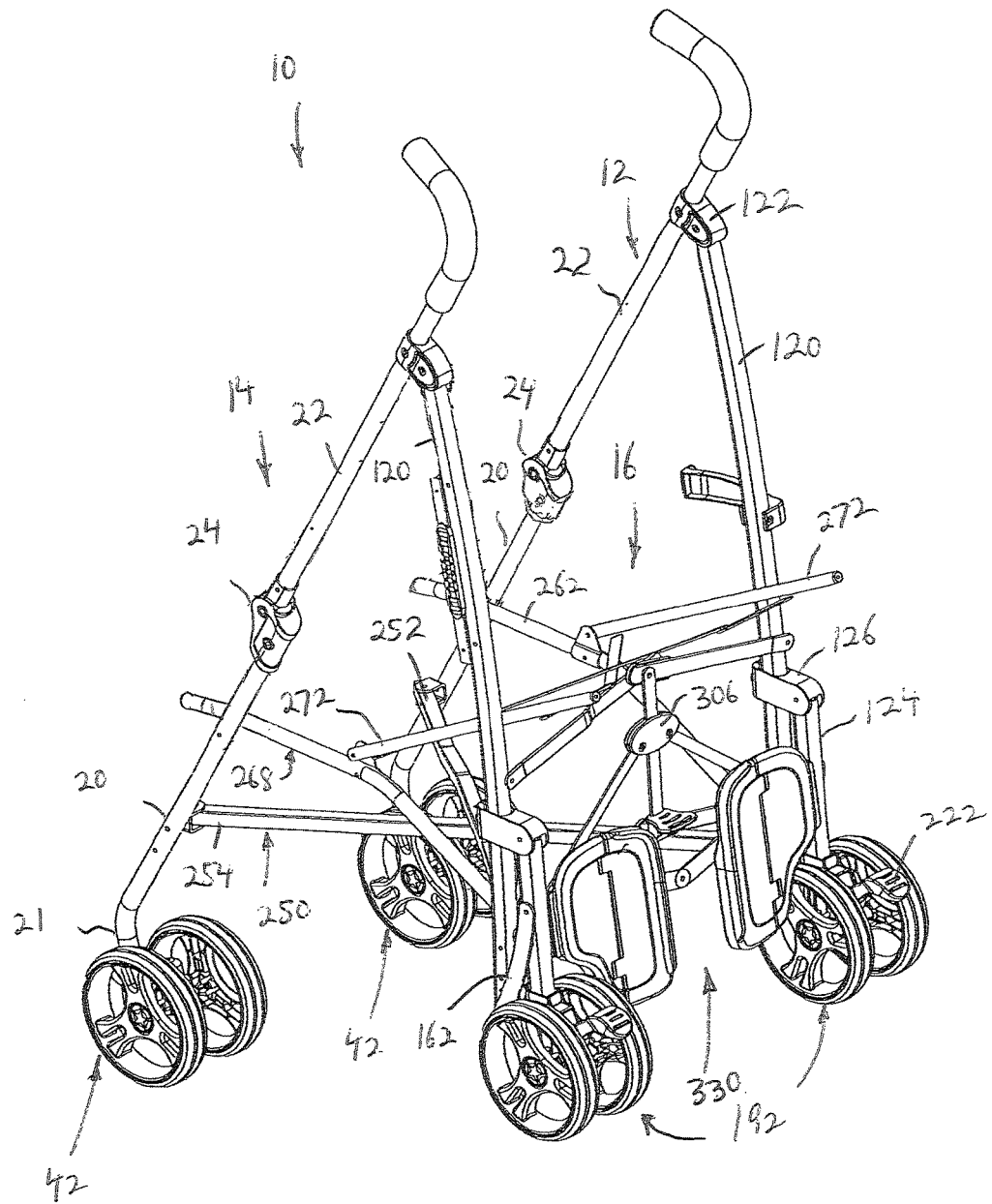
FIG. 4 is a rear, perspective view of the stroller of FIG. 1, with the rear wheels in an inward position.
Figure 5:
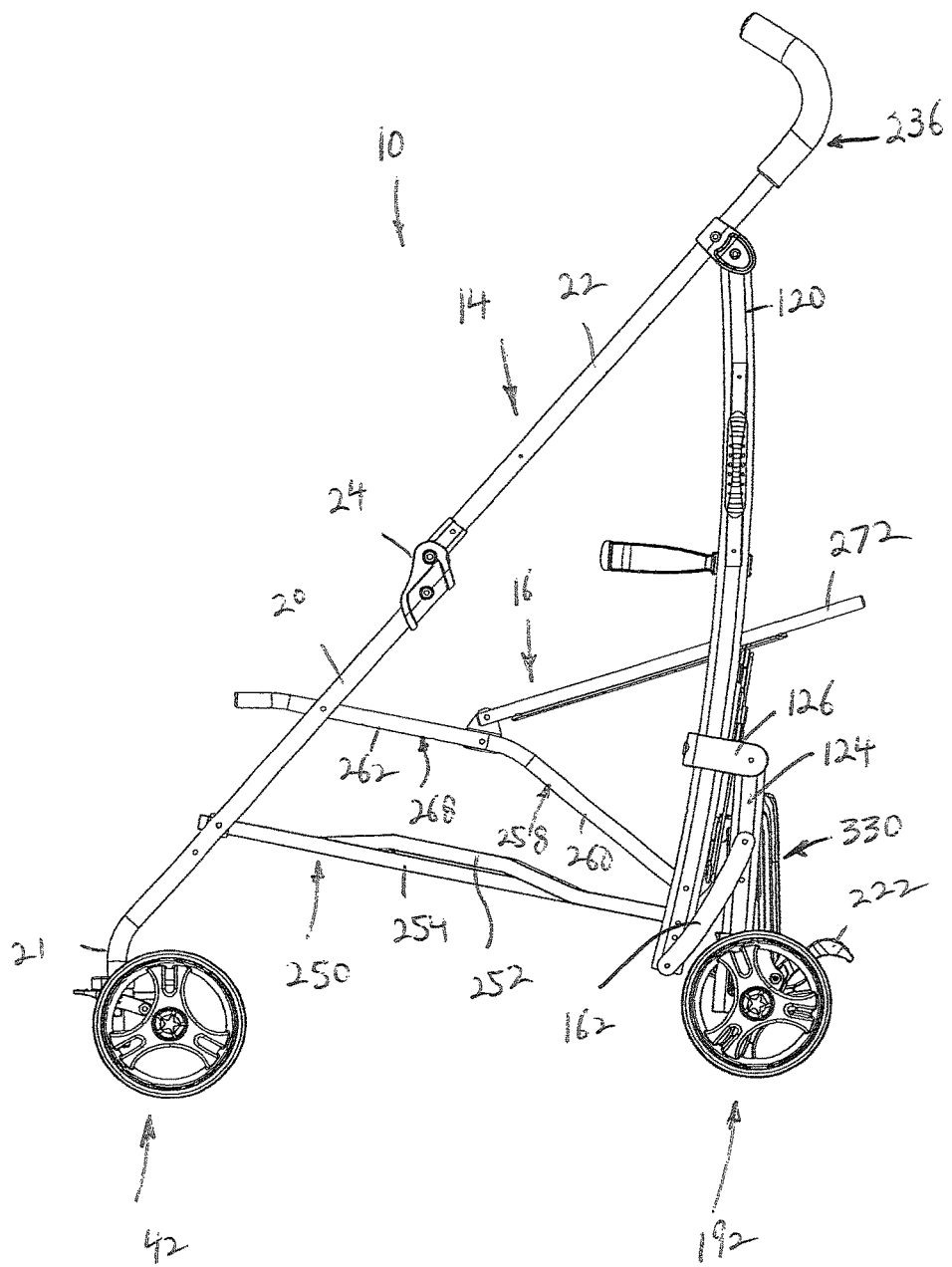
FIG. 5 is a side elevational view of the stroller of FIG. 4.
Figure 6:
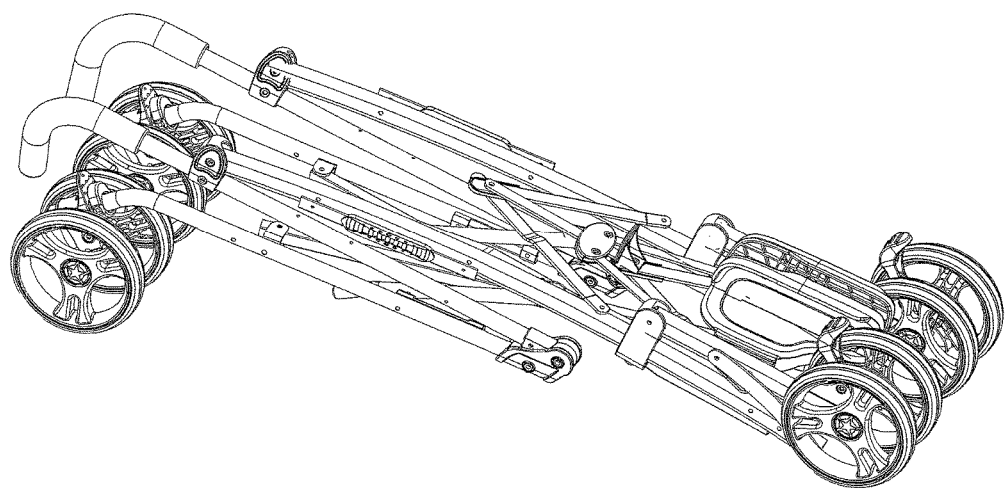
FIG. 6 is a perspective view of the stroller of FIG. 4, in a completely collapsed and folded position.
Figure 7:
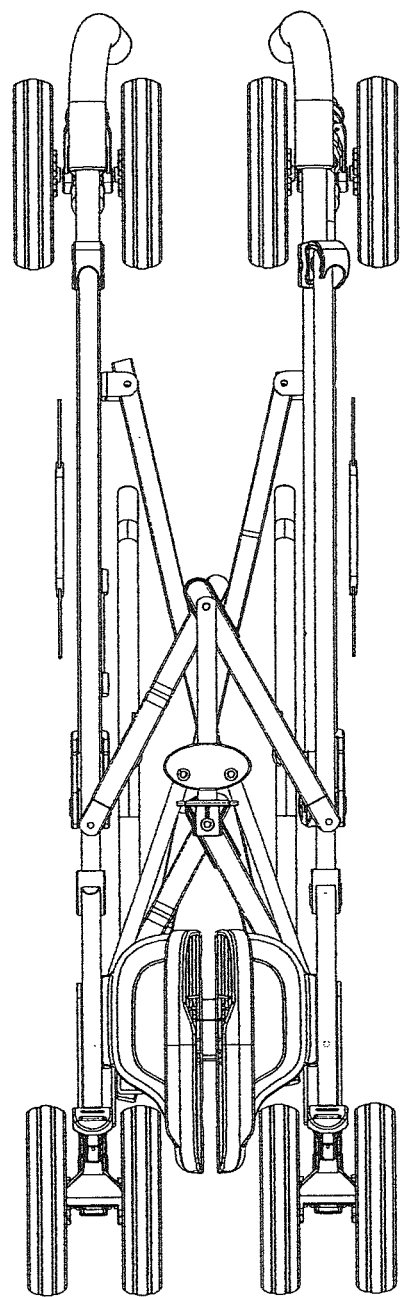
FIG. 7 is a rear elevational view of the stroller of FIG. 6.
Figure 8:
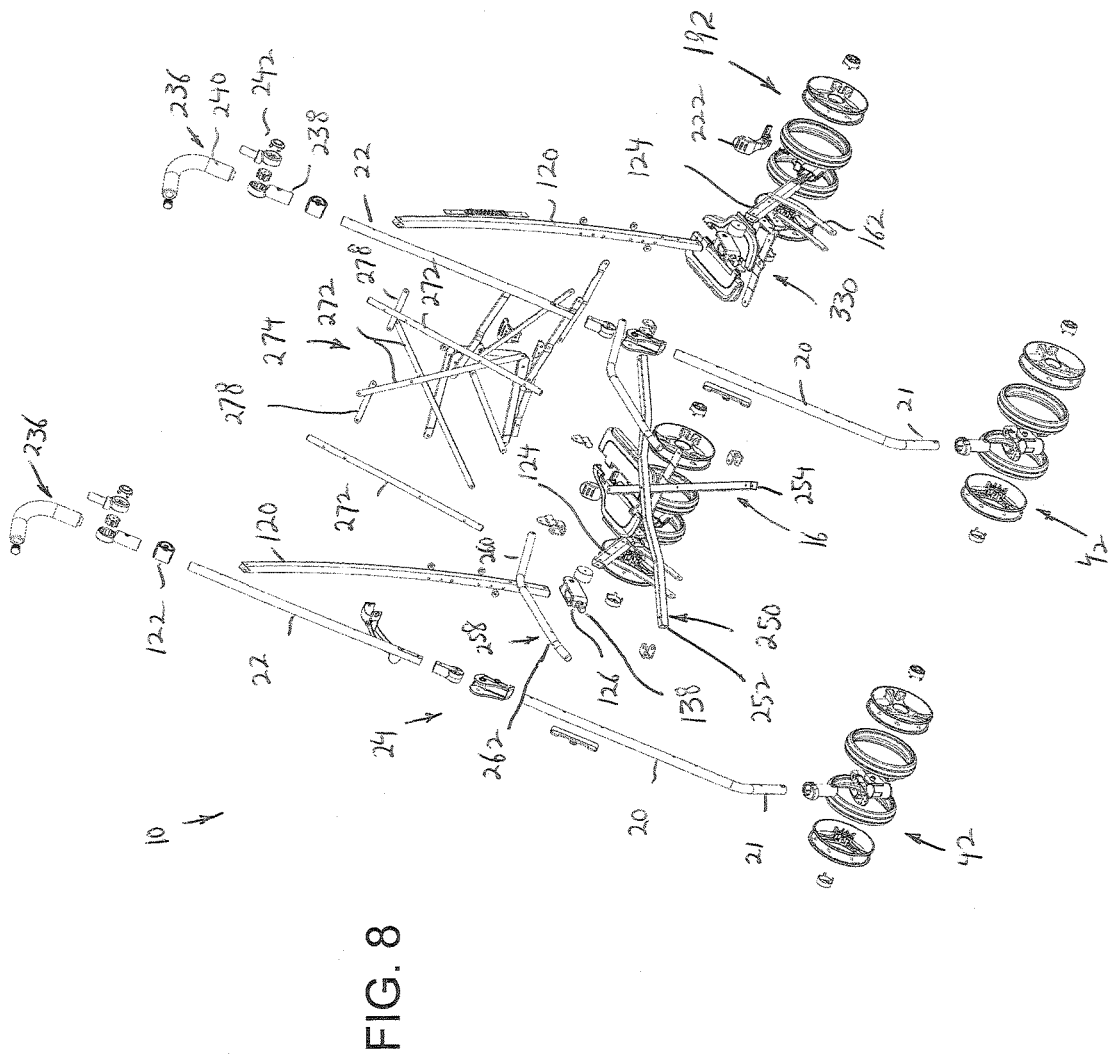
FIG. 8 is an exploded front perspective view of the stroller of FIG. 1.
Figure 9:
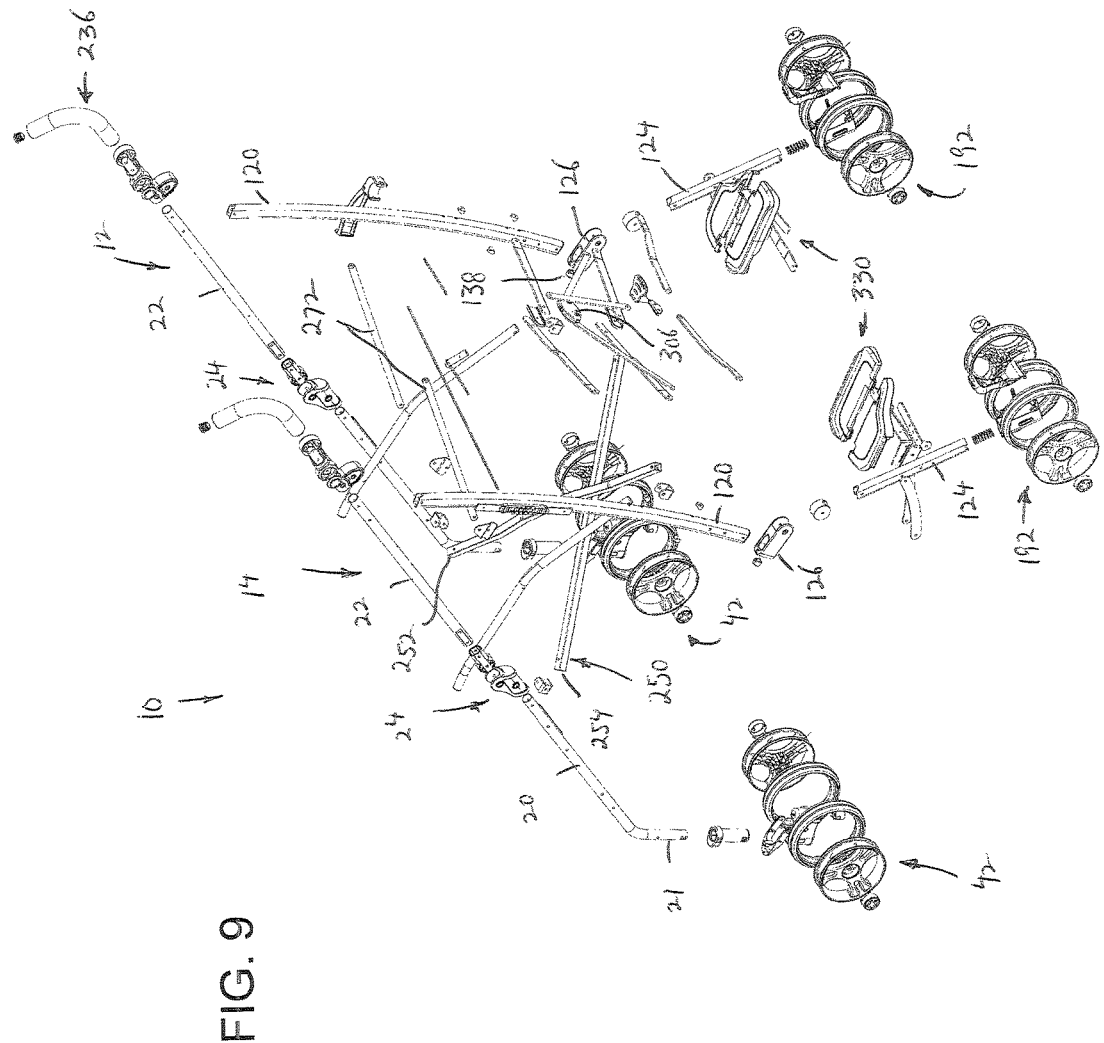
FIG. 9 is an exploded rear perspective view of the stroller of FIG. 1.

With the above arrangement, as shown in FIGS. 4 and 5, when an older child is not standing on standing footboard 330, rear wheels 192 are moved to a compact, inner position, whereby the stroller occupies a smaller footprint. In such position, slide member 126 is held at its upper position by restraining button 148 positioned within through opening 136 of slide member 126. It will be appreciated that, in this position, because of the connection of outer footboard standing section 332, pivoting support housing 336 and linkage bar 424, outer and inner footboard standing sections 332 and 334 are automatically moved to a vertical upright position so as not to interfere with the person pushing the stroller. In such position, preferably, inner footboard standing sections 334 are coplanar with outer footboard standing sections 332.

Figure 2:
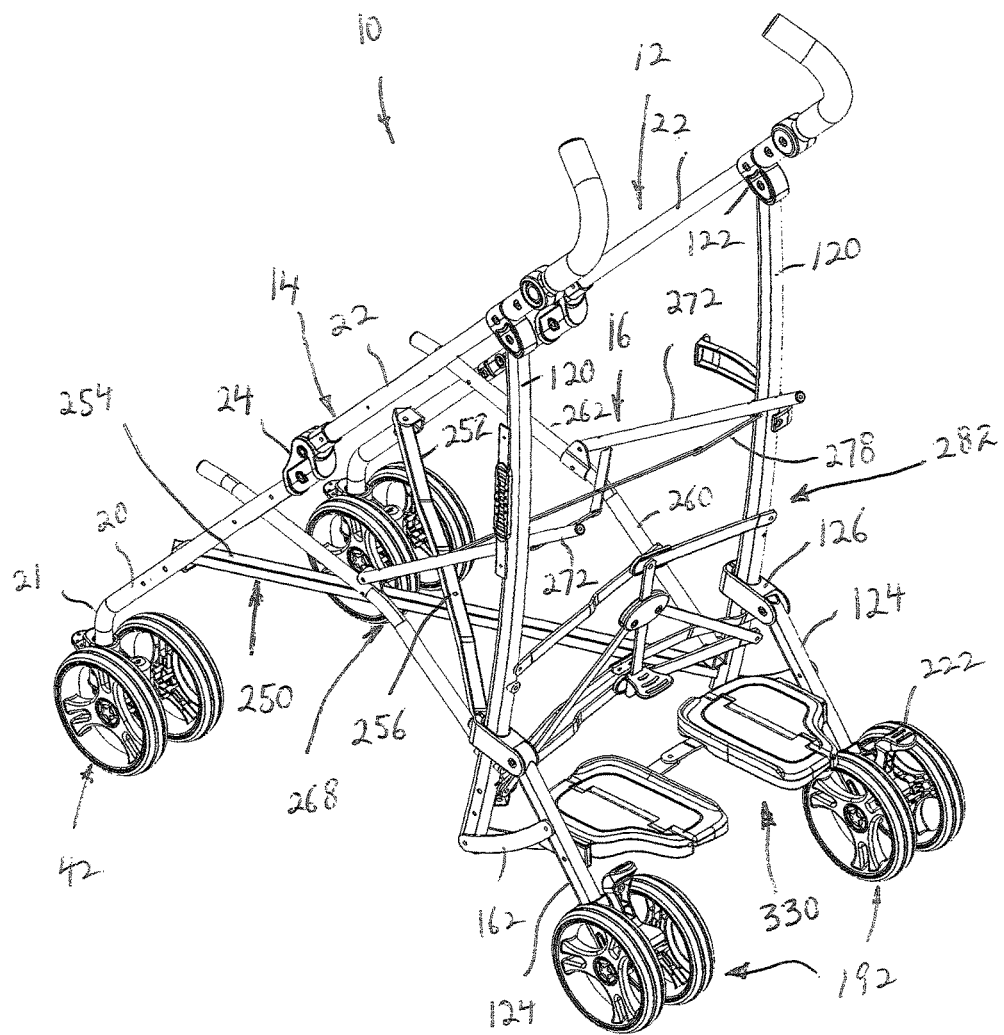
FIG. 2 is a rear perspective view of the stroller of FIG. 1.
Figure 3:
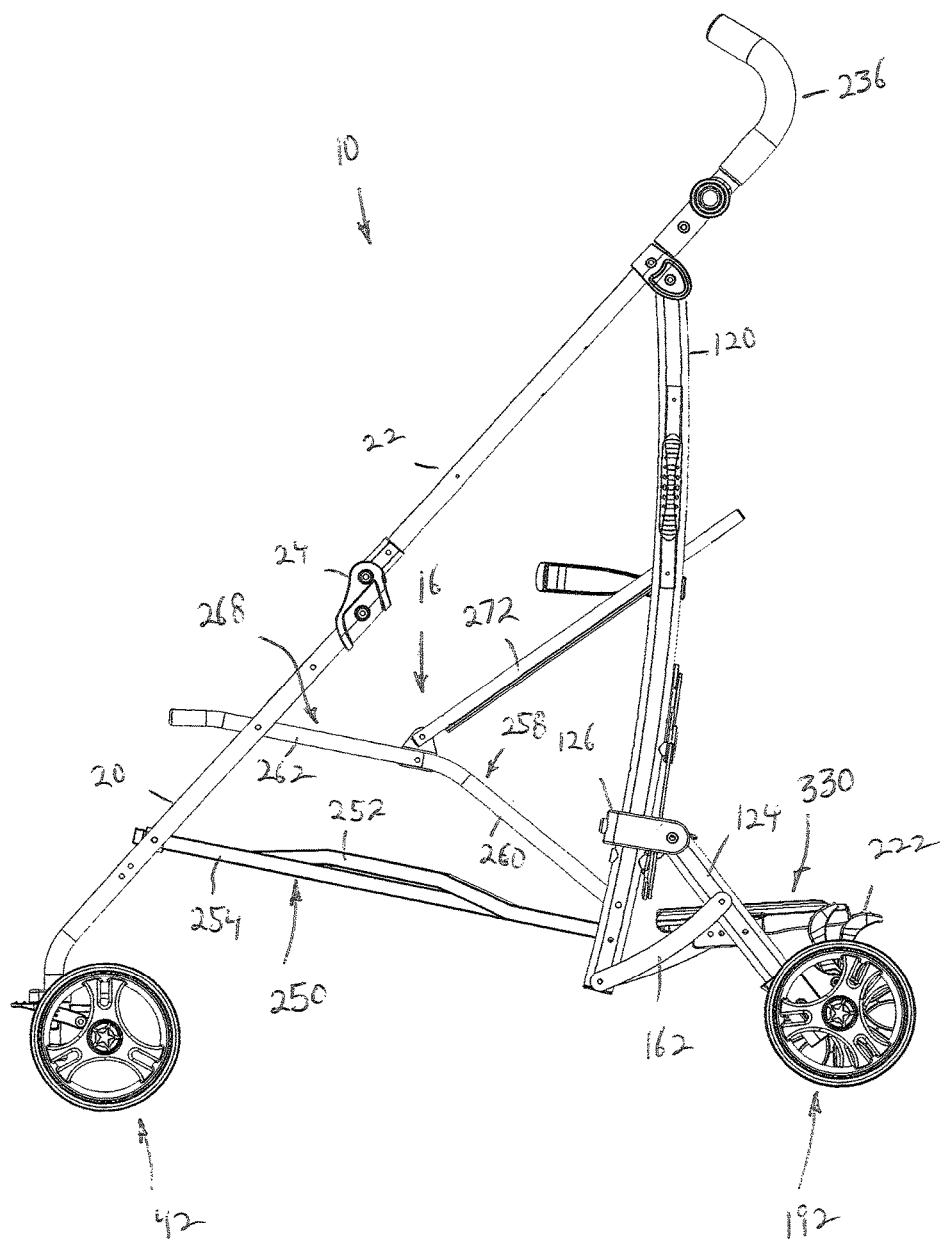
FIG. 3 is a side elevational view of the stroller of FIG. 1.

When it is desired for the older child to stand on standing footboard 330, pushbuttons 138 are depressed, and rear wheel support rods 124 are pivoted outwardly to the positions shown in FIGS. 1-3. At this time, slide member 126 is moved to its lower position and held thereat by the restraining button 148 at the lower position, which is positioned within through opening 136 of slide member 126. Because of the connection of outer footboard standing section 332, pivoting support housing 336 and linkage bar 424, outer and inner footboard standing sections 332 and 334 are automatically moved to the horizontal position shown in FIGS. 1-3. Inner footboard standing sections 334 are moved therewith so as to be coplanar with outer footboard standing section 332, thereby permitting the older child to stand thereon. However, in such position, the stroller has a larger footprint, thereby rendering it more stable when the older child is standing on standing footboard 330.

To collapse the stroller, slide members 126 are moved to their upper positions, thereby moving rear wheels 192 inwardly to the position shown in FIGS. 4 and 5. Then, control pedal 290 is moved up to partially collapse the stroller. However, locking arrangement 310 still prevents full collapse of the stroller. Therefore, push down engagement 314 is pressed down, thereby releasing locking bars 312 to permit full collapse of the stroller, whereby left side support frame 12 and right side support frame 14 are moved toward adjacent each other, and lower front rods 20 and upper front rods 22 are pivoted relative to each other about hinge assemblies 24, whereby the stroller assumes the collapsed position shown in FIGS. 6 and 7. In such position, inner footboard standing sections 334 must be pivoted relative to outer footboard standing sections 332 about hinge pins 368 so that inner footboard standing sections 334 are perpendicular to outer footboard standing sections 332.

Having described a specific preferred embodiment of the invention with reference to the accompanying drawings, it will be appreciated that the present invention is not limited to that precise embodiment and that various changes and modifications can be effected therein by one of ordinary skill in the art without departing from the scope or spirit of the invention as defined by the appended claims.

What is claimed is:

1. A stroller comprising:
a left side support frame;
a right side support frame;
a connecting frame which connects the left side support frame and right side support frame together, the connecting frame including a seat rest for a child;
left and right side front wheels rotatably connected to a front of the left side support frame and right side support frame, respectively;
left and right side rear wheels;
at least one rear footboard connected to a rear end of the stroller; and
an adjustment assembly which rotatably connects the left and right side rear wheels to a rear of the left side support frame and right side support frame, respectively, between a first inward operative position of the stroller for use when a child is not standing on the at least one rear footboard and a second outward operative position of the stroller which increases a footprint of the stroller for use when a child is standing on the at least one rear footboard.

2. A stroller according to claim 1, wherein the adjustment assembly includes a rear wheel support at left and right sides of the stroller, with each rear wheel support having one end pivotally connected to the rear of one of the left and right side support frames, and at least one said rear wheel rotatably connected to an opposite end of each rear wheel support.

3. A stroller according to claim 2, wherein the adjustment assembly further includes a releasable securing assembly at left and right sides of the stroller and connected with each rear wheel support for releasably securing each rear wheel support between a first securing position when the rear wheels are at the first inward operative position and a second securing position when the rear wheels are at the second outward operative position.

4. A stroller according to claim 3, wherein each of the left and right side support frames includes a front frame and a rear frame connected to the front frame, and the releasable securing assembly includes a slide member slidably mounted between a first upper position and a second lower position on the respective rear frame, and the one end of each rear wheel support being pivotally connected to a respective said slide member.

5. A stroller according to claim 4, wherein the releasable securing assembly includes upper and lower spring biased members mounted to each rear frame for locking engagement with the respective slide member, and each slide member includes a release button for disengaging the upper and lower spring biased members from the slide member to enable sliding of the slide member on the respective rear frame for movement between the first upper position and second lower position.

6. A stroller according to claim 4, wherein the adjustment assembly further includes a link arm connecting the rear frame of each left and right support frame with a respective said wheel support.

7. A stroller according to claim 2, wherein each rear wheel support includes a rear wheel rod.

8. A stroller according to claim 1, wherein each said rear footboard is connected to a respective one of the left and right side support frames in a manner to automatically move between a vertical position which prevents a child from standing thereon when said left and right side rear wheels are moved to the first inward operative position, and a horizontal position which permits a child to stand thereon when said left and right side rear wheels are moved to the second outward operative position.

9. A stroller according to claim 8,
wherein the adjustment assembly includes a rear wheel support at left and right sides of the stroller, with each rear wheel support having one end pivotally connected to the rear of one of the left and right side support frames, and at least one said rear wheel rotatably connected to an opposite end of each rear wheel support; and
wherein each said rear footboard is pivotally mounted to a respective said rear wheel support.

10. A stroller according to claim 9,
wherein each of the left and right side support frames includes a front frame and a rear frame connected to the front frame; and
further comprising:
a pivot support housing for pivotally mounting each said rear footboard to a respective said rear wheel support, and
a link arm connecting the rear frame of each left and right support frame with a respective said pivot support housing.

11. A stroller according to claim 10, wherein each said pivot support housing includes at least one support bar extending from the pivot support housing to a position beneath the respective said rear footboard for providing additional support.

12. A stroller according to claim 1, wherein each said rear footboard includes an outer footboard standing section connected to a rear end of the stroller, and an inner footboard standing section hingedly connected to the respective outer footboard standing section, for movement between a first position in which the outer footboard standing section and inner footboard standing section are coplanar and a second position in which the outer footboard standing section and inner footboard standing section are at right angles to each other.

13. A stroller comprising:
a left side support frame;
a right side support frame;
a connecting frame which connects the left side support frame and right side support frame together, the connecting frame including a seat rest for a child;
left and right side front wheels rotatably connected to a front of the left side support frame and right side support frame, respectively;
left and right side rear wheels;
at least one rear footboard connected to a rear end of the stroller, with each said rear footboard connected to a respective one of the left and right side support frames and movable between a vertical position which prevents a child from standing thereon and a horizontal position which permits a child to stand thereon;
wherein each said rear footboard includes an outer footboard standing section connected to a rear end of the stroller, and an inner footboard standing section hingedly connected to the respective outer footboard standing section, for movement between a first position in which the outer footboard standing section and inner footboard standing section are coplanar and a second position in which the outer footboard standing section and inner footboard standing section are at right angles to each other.

14. A stroller according to claim 13, wherein each said rear footboard is pivotally mounted to a respective one of the left and right side support frames.

15. A stroller according to claim 14, further comprising a pivot support housing for pivotally mounting each said rear footboard to a respective one of the left and right support frames.

16. A stroller according to claim 15, wherein each said pivot support housing includes at least one support bar extending from the pivot support housing to a position beneath the respective said rear footboard for providing additional support.

* * * * *